US012700316B1

(12) United States Patent
Colpitts et al.

(10) Patent No.: US 12,700,316 B1
(45) Date of Patent: Aug. 4, 2026

(54) SYSTEMS AND METHODS TO DETERMINE FLIGHT PATHS FOR AERIAL VEHICLES BASED ON RISK

(71) Applicant: Amazon Technologies, Inc., Seattle, WA (US)

(72) Inventors: Cameron Yujin Colpitts, Seattle, WA (US); Javier Alonso Lopez, Edmonds, WA (US); Dale Lawrence Henderson, Bainbridge Island, WA (US); Nupur Bansal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 729 days.

(21) Appl. No.: 17/030,320

(22) Filed: Sep. 23, 2020

(51) Int. Cl.

| | |
|---|---|
| ***G08G 5/32*** | (2025.01) |
| ***G08G 5/22*** | (2025.01) |
| ***G08G 5/34*** | (2025.01) |
| ***G08G 5/53*** | (2025.01) |
| ***G08G 5/55*** | (2025.01) |
| ***G08G 5/57*** | (2025.01) |

(52) U.S. Cl.
CPC ................ *G08G 5/32* (2025.01); *G08G 5/22* (2025.01); *G08G 5/34* (2025.01); *G08G 5/53* (2025.01); *G08G 5/55* (2025.01); *G08G 5/57* (2025.01)

(58) Field of Classification Search
CPC .. G08G 5/0034; G08G 5/0026; G08G 5/0039; G08G 5/0052; G08G 5/0069; G05D 1/106; G05D 1/1062; G05D 1/1064
See application file for complete search history.

(56) References Cited

U.S. PATENT DOCUMENTS

| | | | |
|---|---|---|---|
| 9,959,772 | B2 | 5/2018 | Priest |
| 10,789,853 | B2 | 9/2020 | Priest |
| 11,482,117 | B2 | 10/2022 | Sachs et al. |

(Continued)

FOREIGN PATENT DOCUMENTS

| | | |
|---|---|---|
| CN | 106347913 A | 1/2017 |

OTHER PUBLICATIONS

Sachs, Peter. “A Quantitative Framework for UAV Risk Assessment.” Altiscope Version 1.0, 2018, 51 pages (Year: 2018).

(Continued)

*Primary Examiner* — James J Lee
*Assistant Examiner* — David Hatch
(74) *Attorney, Agent, or Firm* — Athorus, PLLC

(57) ABSTRACT

Described are example systems and methods generally directed to systems and methods for determining and managing flight planning and operations for unmanned vehicles, such as unmanned aerial vehicles (UAVs). The described systems and methods can facilitate generation of a risk-weighted model of an environment in which vehicles may operate to facilitate determination of a total cumulative risk associated with certain flight paths between an origin and a destination in the environment. The total cumulative risk associated with a flight path can include a risk associated risks present on the ground along the flight path, as well as risks associated with the vehicle performing the flight. The total cumulative risk for a given flight path can be used to identify flight paths presenting the lowest relative risk and can also be compared against a risk threshold to determine whether the total cumulative risk associated with the flight path is within an acceptable range.

18 Claims, 12 Drawing Sheets

(56) References Cited

U.S. PATENT DOCUMENTS

| | | | | |
|---|---|---|---|---|
| 2016/0140851 | A1* | 5/2016 | Levy | G08G 5/0034 701/410 |
| 2017/0199041 | A1* | 7/2017 | Itabashi | G08G 5/0039 |
| 2017/0286892 | A1 | 10/2017 | Studnicka | |
| 2018/0357909 | A1 | 12/2018 | Eyhorn | |
| 2019/0086523 | A1 | 3/2019 | Liem et al. | |
| 2019/0355263 | A1 | 11/2019 | Priest | |
| 2020/0005651 | A1 | 1/2020 | Priest | |
| 2020/0111372 | A1 | 4/2020 | Yamada et al. | |
| 2020/0175468 | A1* | 6/2020 | Tsuruta | B64C 39/024 |
| 2020/0219407 | A1 | 7/2020 | Priest | |
| 2020/0250998 | A1 | 8/2020 | Priest | |
| 2021/0141373 | A1 | 5/2021 | Bash et al. | |

OTHER PUBLICATIONS

Wu, Z. et al. "Path Planning of UAVs Based on Collision Probability and Kalman Filter." IEEE Access 6 (2018): 34237-34245 (Year: 2018).

Zhang, N. et al. "Collision probability between intruding drone and commercial aircraft in airport restricted area based on collision-course trajectory planning", Transportation Research Part C: Emerging Technologies, vol. 120, 2020, 19 pages (Year: 2020).

* cited by examiner

100

SYSTEMS AND METHODS TO DETERMINE FLIGHT PATHS FOR AERIAL VEHICLES BASED ON RISK

BACKGROUND

The public's safety is typically a priority in aviation. The public's safety can be of particular importance to organizations providing delivery of consumer products via robotic systems such as unmanned aerial vehicles and drones. Accordingly, route planning for such delivery vehicles can play a vital role in the safety and viability of performing such deliveries. In performing route planning, a binary approach has typically been employed, where geographic areas are divided into cells where flights are permitted and flights are not permitted. Although this approach may permit and restrict flights over certain geographic areas, it may not consider a total risk of a flight path over the entire duration of performing a delivery using the flight path.

DETAILED DESCRIPTION

Figure 1:
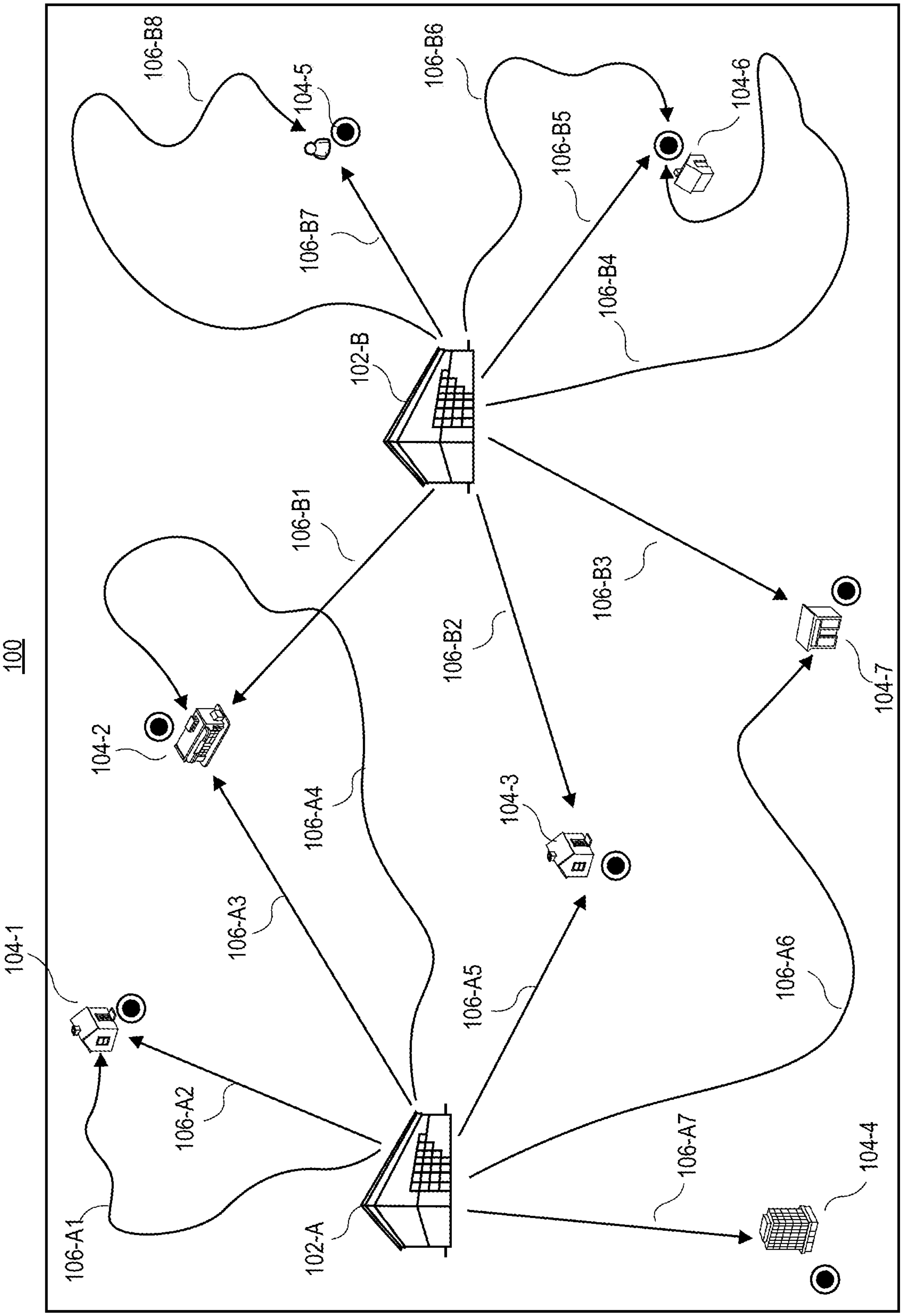
FIG. 1 illustrates an exemplary environment with exemplary flight paths between source locations and delivery destinations, according to embodiments of the present disclosure.

As is set forth in greater detail below, embodiments of the present disclosure are generally directed to systems and methods for determining and managing flight planning and operations for unmanned vehicles, such as unmanned aerial vehicles (UAVs). For example, embodiments of the present disclosure can facilitate generation of a risk-weighted model of an environment in which vehicles may operate. The risk-weighted model can facilitate determination of a total cumulative risk associated with certain flight paths between an origin and a destination in the environment, which can facilitate selection of flight paths with lower total cumulative risks. A "flight path" can describe any aerial flight, or portion thereof, including one or more flight parameters to be followed by an aerial vehicle as it aerially navigates between a source location and a delivery destination. For example, the flight path may specify ranges or areas regarding heading, speed, altitude, coordinates, etc., and the aerial vehicle may operate within those ranges as it navigates the flight path. The total cumulative risk associated with a flight path can include a risk associated with parameters and characteristics present on the ground along the flight path, as well as a risk associated with the vehicle performing the flight. The total cumulative risk for a given flight path can also be compared against a risk threshold value to determine whether the total cumulative risk associated with the flight path is within an acceptable range.

According to exemplary embodiments of the present disclosure, a total cumulative risk associated with a flight path from an origin, such as a materials handling facility, to a destination, such as a customer's home, can represent the total risk along the flight path over the duration of a mission flown from the origin along the flight path to the destination at a given time. The total cumulative risk can include the ground risk presented on the ground along the flight path during the anticipated time of the mission and the vehicle risk presented by the vehicle following the flight path in performing the mission.

The ground risk can be determined in view of certain ground information representative of certain parameters and conditions present on the ground along the flight path. For example, the ground risk can consider ground information such as population density, sensitive structures (e.g., government facilities, airports, schools, facilities with hazardous materials, nuclear power plants, electrical infrastructure, telecommunications infrastructure, covered vs. uncovered spaces, etc.), etc. According to certain aspects of the present disclosure, certain aspects of ground risks may be vary depending on time. For example, the risk of performing a mission over a school may be higher during the school day when compared to performing the mission over the school when school is not in session. Similarly, the risk of performing a mission over an interstate highway may increase during commuting times when more vehicles (i.e., more people) are located on the interstate highway, etc. Ground information can also include real-time information that may be representative of conditions on the ground (e.g., number of cellular customers in an area, traffic conditions, emergency conditions, current and expected weather conditions, etc.). Additionally, risk may also depend on whether the area is a covered (e.g., building, etc.) or an uncovered (e.g., park, open space, etc.). For example, the probability of injuring or harming a person located within a covered facility (e.g., a building, etc.) may be lower than the probability of injuring or harming a person in an uncovered area (e.g., a park or playground).

In addition to ground risk, the total cumulative risk associated with the flight path can also include a vehicle risk. Determining the vehicle risk can include vehicle information associated with the vehicle that is anticipated to perform the mission as well as the flight path the vehicle is anticipated to fly. For example, vehicle information can include parameters and characteristics associated with the vehicle, such as, vehicle type, battery charge, battery type, weight of payload, rate of energy consumption/expenditure, time since last flight, time since last maintenance service, length of last flight, temperature of certain components, weight of payload on last flight(s), emergency handling and landing capabilities, etc. Additionally, vehicle risk can also include a consideration of the difficulty of the flight path. For example, this can include factors such as length/duration of the flight path, vehicle maneuvers (e.g., banking, climbs, descents, etc.), etc. Accordingly, vehicle risk can be vehicle-type dependent, and may vary based on vehicle type for any given flight path.

According to certain aspects of the present disclosure, it may be assumed that ground risk and vehicle risk are independent. Alternatively, according to certain aspects, ground risk and vehicle risk may not be independent. For example, an increasing ground risk (e.g., an increase in population density, etc.) may increase a risk that a person may intentionally act toward the vehicle (e.g., shining a laser pointer, discharging a firearm, etc.) that may affect the probability of a vehicle failure, thus affecting vehicle risk.

According to certain aspects of the present disclosure, the total cumulative risk can be updated in real-time based on information collected by the vehicle as the vehicle is performing a mission. For example, the vehicle may receive real-time data and/or information regarding ground conditions, vehicle conditions, etc. that may affect the total cumulative risk associated with the flight path being flown. Accordingly, the total cumulative risk for the flight path can be updated in view of the newly acquired real-time data and/or information. Further, based on the updated total cumulative risk, a new flight path may be selected, the current flight path may be modified, the current mission may be cancelled, etc.

The total cumulative risk can also be used to determine the relative risk between a plurality of flight paths that can compose a flight between an origin and a destination. For example, the total cumulative risk can be determined for a plurality of different flight paths between an origin and a destination and the flight path with the lowest total cumulative risk can be selected as a preferred flight path, as it may present the lowest relative total cumulative risk of the compared flight paths. The preferred flight path may be stored in a data store. As the total cumulative risk may vary as a function of time, the preferred flight path may differ for different seasons, months, days of the week, time of day, etc.

According to certain aspects of the present disclosure, the preferred flight path can be incrementally determined using the risk-weighted model (e.g., a weighted four-dimensional graph of possible flight paths, etc.) using a stepwise search algorithm approach such as the A* algorithm, Dijkstra's Algorithm, a greedy best first search algorithm, gradient descent algorithm, etc., where the risk-weighted model represents a total risk, which includes a ground risk and a vehicle risk. For example, the risk-weighted model can facilitate incremental determination of a total cumulative risk based on the flight path a vehicle may follow as it operates between an origin and a destination. According to certain aspects of the present disclosure, the risk-weighted model can be represented as a weighted four-dimensional nodal graph, where each node can represent a position in the graph (e.g., latitude, longitude, elevation, and time, etc.) and the weights can represent the incremental risk of progressing to the next node in the nodal graph. Accordingly, a stepwise, incremental search algorithm, such as A* algorithm, Dijkstra's Algorithm, a greedy best first search algorithm, gradient descent algorithm, etc. can be applied to incrementally determine a preferred flight path (e.g., the flight path with the lowest relative risk, etc.). According to other aspects of the present disclosure, the weights can incorporate other factors, such as energy cost, time cost, financial cost, etc.

Alternatively and/or in addition, the total cumulative risk can facilitate determination of whether a mission between a given origin and a given destination can be completed in view of a total cumulative risk threshold. For example, a total cumulative risk threshold can be established to determine a level of "acceptable" risk for a mission. The total cumulative risk threshold can be established by law, regulations, an organization, or any considerations or combination thereof. Accordingly, it can be determined that flight paths having a total cumulative risk below the established total cumulative risk threshold can be performed, whereas flight paths having a total cumulative risk above the threshold should not be performed. The flight paths having a total cumulative risk below a total cumulative risk threshold may be stored in a data store as available or "viable" flights, and flight paths having a total cumulative risk above a total cumulative risk threshold may be stored in a data store as unavailable flight paths.

Such thresholds may be utilized, for example, by an e-commerce organization in determining the availability of aerial delivery, via an aerial vehicle such as a UAV, in connection with the purchase of an item. According to one aspect of the present disclosure, as a customer is placing perusing items on an e-commerce platform of an e-commerce organization, after a delivery address of the customer has been determined, a source location (e.g., materials handling facility, fulfillment center, etc.) can be determined from where the item may be provided. Accordingly, based on the source location and the delivery destination of the customer, the total cumulative risk for potential flight paths between the source location and the delivery destination can be determined. The total cumulative risks can be compared against a total cumulative risk threshold, and if the total cumulative risk for at least one of the potential flight paths is below the total cumulative risk threshold, it can be determined that an aerial delivery can be performed and an aerial delivery option may be presented to the customer.

Employing a total cumulative risk in assessing the potential risks of potential flight path facilitates enhanced risk mitigation of missions, as well as making previously unavailable destinations accessible. For example, utilizing the total cumulative risk can facilitate mitigating risk by permitting selection of the flight path having the lowest relative risk between an origin and a destination. Further, in contrast to a discrete, generalized binary geography system composed of fly and no-fly zones, which has been traditionally used, utilizing a total cumulative risk can potentially open up previously unavailable destinations. For example, destinations located in a geographic area previously labeled as a no-fly zone can become accessible if the total cumulative risk over the entire mission to that destination is below a total cumulative risk threshold.

While the examples discussed herein often refer to a fulfillment center as a source location and a customer specified location as a delivery destination, the disclosed embodiments are equally applicable to other forms or locations. In general, the source location may be any location from which an aerial transport of an item may be initiated and a delivery destination may be any location at which delivery of the item may be completed. For example, a source location may include, but is not limited to, a ground based fulfillment center, an aerial based fulfillment center, a water based fulfillment center, a fulfillment center located beyond the earth's troposphere, a customer's home, a business address, etc. Likewise, a delivery destination may include, but is not limited to, a customer's home address, a geographic coordinate, an automobile (moving or stationary), a water based vehicle (moving or stationary), a building, a park, another aerial vehicle, a location beyond the earth's troposphere, etc.

Further, although embodiments of the present disclosure are described primarily with respect to aerial vehicles, embodiments of the present disclosure can be applicable to any other types of automated vehicles. For example, embodiments of the present disclosure can be applicable to unmanned aerial vehicles, ground based vehicles, autonomous ground based vehicles, water based vehicles, unmanned water based vehicles, space vehicles, etc.

FIG. 1 illustrates exemplary environment 100 according to exemplary embodiments of the present disclosure. As shown in FIG. 1, environment 100 can include flight paths 106 between source locations 102 and delivery destinations 104. In exemplary environment 100, source locations 102-A and 102-B can include any facility where items to be delivered may originate, such as materials handling facilities, a warehouse, a fulfillment center, a retail location, etc. Further, delivery destinations 104-1, 104-2, 104-3, 104-4, 104-5, 104-6, and 104-7 can include any location to which an item may be delivered, and may include a customer residence, an office, another materials handling facility, such as a warehouse, fulfillment center, retail location, etc. Flight paths 106 can represent some of the various possible flight paths between the respective source locations 102 and delivery destinations 104.

As shown in FIG. 1, one or more flight paths 106 may be determined between one of source locations 102 and one of delivery destinations 104. According to certain aspects, flight paths for certain delivery destinations (e.g., delivery destination 104-2, 104-3, and 104-7) may include flight paths from more than one source location 102. Specifically, flight paths 106-A1, 106-A2, 106-A3, 106-A4, 106-A5, 106-A6, and 106-A7 between the source location 102-A and each respective delivery destination 104-1, 104-2, 104-3, 104-4, and 104-7 can be determined. Similarly, flight paths 106-B1, 106-B2, 106-B3, 106-B4, 106-B5, 106-B6, 106-B7, and 106-B8 between the source location 102-B and each respective delivery destination 104-2, 104-3, 104-5, 104-6, and 104-7 can be determined. Each flight path 106 may specify one or more flight parameters to be followed by an aerial vehicle as it aerially navigates between a source location 102 and a delivery destination 104, and the term "flight path," as used herein, may include any segment and/or portion of exemplary flight paths 106. For example, the flight path may specify ranges or areas regarding heading, speed, altitude, coordinates, etc., and the aerial vehicle may operate within those ranges as it navigates the flight path 106. Further, each flight path 106 may avoid prohibited airspace, restricted airspace, and/or other no-fly zones implemented and maintained by the government or private organization (e.g., military base, airport, government buildings, etc.).

For each flight path 106 shown in FIG. 1, a total cumulative risk may be determined to ascertain the viability of each flight path 106 from a perspective of total risk and/or ascertain the flight path with the lowest relative total risk for performing a mission, such as delivering an item. According to embodiments of the present disclosure, the total cumulative risk associated with each flight path 106 can represent a probability of causing human harm or injury and/or experiencing a vehicle failure while the vehicle is navigating along the respective flight path 106. The total cumulative risk can include a ground risk, which can represent a probability of causing human harm or injury in view of conditions on the ground over which the aerial vehicle navigates while performing a mission while following the respective flight path 106, and a vehicle risk, which can represent a probability of a vehicle failure while the vehicle is performing the mission using the respective flight path 106. According to certain aspects of the present disclosure, it may be assumed that ground risk and vehicle risk are independent, however, according to other embodiments, ground risk and vehicle risk may be considered to not be independent. For example, an increasing ground risk (e.g., an increase in population density, etc.) may increase a risk that a person may intentionally act toward the vehicle (e.g., shining a laser pointer, discharging a firearm, etc.) that may affect the probability of a vehicle failure, thus affecting vehicle risk.

Ground risk may represent the probability of causing human injury or harm and may include population density as one component in determining the ground risk associated with a flight plan, as higher population densities generally present a higher probability of injuring a person should a failure occur with a vehicle. Ground risk may also include other factors, such as, for example, events affecting population density (e.g., events, time of day, etc.), sensitive structures and areas (e.g., a nuclear or chemical plant, a school, etc.), etc. Vehicle risk may represent the probability of a vehicle failure, and may include factors such as flight time, flight maneuvers, time since last maintenance, energy consumption, speed, changes in altitude, vehicle type, etc.

According to exemplary embodiments of the present disclosure, in determining the total cumulative risk for each flight path, each flight path can be represented as:

$path_i(t)=[x, y, z]$ where [x, y, z] can represent the latitude, longitude, and elevation of an aerial vehicle performing a mission along the flight path i at time t. Further, ground risk can be represented as:

$$\text{world\_risk}(x, y, z, t) = \frac{dP(\text{injury}|\text{vehicle\_failure})}{dt}$$

where world_risk(x, y, z, t)dt can represent the risk of causing an injury to a person (e.g., represented as a probability of injury, etc.) at the position (e.g., latitude, longitude, and altitude) defined by x, y, z, at time t. Accordingly, world_risk(x, y, z, t)dt can be represented as a four-dimensional scalar field representing the rate of ground risk accumulation. Although ground risk can vary as a function of time (e.g., transient effects such as social gatherings, traffic, shifts in population density, etc.), over short periods of time, the ground risk function can be assumed to be fixed with respect to time t, as significant changes in population density and other ground risk factors (e.g., location of sensitive structures, etc.) are unlikely to occur over short periods of time. Accordingly, over short periods of time, world_risk(x, y, z, t)dt can be understood to be a three-dimensional scalar field based on location (e.g., latitude, longitude, and altitude).

In addition to ground risk, vehicle risk, which can represent the probability of a vehicle failure, can be represented as:

$$\text{vehicle\_risk}(\text{path}_i(t)) = \frac{dP(\text{vehicle\_failure})}{dt}$$

where vehicle_risk($path_i$(t)) dt can represent the risk of a vehicle failure (e.g., represented as a probability of failure, etc.) at time t as the vehicle navigates along $path_i$. The risk of vehicle failure can be based on flight time (e.g., increases as a function of flight time, etc.), rate of energy expenditure, velocity of the vehicle, time since last maintenance, maneuvers required of the vehicle as defined by the flight path, etc. Accordingly, the same flight paths may present different vehicle risk (and different total cumulative risk) based on how the flight path is flown (e.g., velocity, etc.) and which vehicle operates on the flight path. Further, since vehicle risk generally increases as the length of flight increases, factors encountered earlier in flight may present a lower risk when compared to factors encountered later in flight. For example, the vehicle risk presented by performing a certain maneuver early on in flight may be lower than the vehicle risk presented by performing the same maneuver under the same conditions later during the same flight.

Based on the ground risk and the vehicle risk, the total cumulative risk associated with a flight path can be represented as:

$$\text{risk}_i = \int_{t=0}^{t=mission\_len} \text{vehicle\_risk}(\text{path}_i(t)) * \text{world\_risk}(\text{path}_i(t))dt$$

where $risk_i$ can represent the total cumulative risk (e.g., represented as a probability of injury to a person and a probability of vehicle failure, etc.) associated with flight path i. Flight path i can be any one of flights paths 106 as shown in FIG. 1, or any other flight path between a source location and a delivery destination for which a mission is being planned, and the number of flight paths i is preferably unbounded. The combination of the ground risk and the vehicle risk to determine total cumulative risk can facilitate generation of a risk-weighted model of the environment in which the vehicle will operate. For example, the risk-weighted model can be represented as a four-dimensional (e.g., latitude, longitude, altitude, and time) weighted graph, where the weight can represent the incremental total cumulative risk of the vehicle operating in the environment. Determination of a total cumulative risk is described further in connection with FIG. 6.

Accordingly, once the total cumulative risk associated with one or more flight paths has been determined, the total cumulative risks associated with the flight paths can be used to determine whether a mission can be viably performed in view of the total cumulative risk and/or facilitate selection of the flight path with the lowest relative predicted total cumulative risk. For example and with regard to FIG. 1, the total cumulative risk determined for each flight path 106 can be used, for example, to determine whether an aerial mission between a source location 102 and a delivery destination 104 can be performed in view of the total cumulative risk presented by performing such a mission along each respective flight path 106.

According to certain exemplary embodiments, in determining whether a mission can be performed using a certain flight path, a total cumulative risk threshold can first be determined. For example, a baseline total cumulative risk of causing human harm or injury and/or damage from a vehicle failure (e.g., on the ground and to the vehicle, etc.) that may be deemed "acceptable" can first be determined. Based on the baseline risk, a threshold value of the total cumulative risk can be extrapolated from the baseline value of the "acceptable" risk. The baseline acceptable risk may be established, for example, by law, regulation, the government, a governmental agency, or other regulatory or governing body, etc. According to certain aspects of the present disclosure, the threshold value of total cumulative risk can be determined for various flight paths. For example, the total cumulative risk can be determined in connection with a flight path for a round-trip completed mission (e.g., for the vehicle to perform a delivery and navigate to the facility at which it is to land). Alternatively, a total cumulative risk threshold value can be determined for an outbound flight path and/or an inbound flight path. Alternatively and/or in addition, the total cumulative risk threshold value can be determined for an incremental interval of a flight path or any portion thereof.

Accordingly, after a total cumulative risk threshold has been determined, the total cumulative risk for each flight path 106 can be compared against the total cumulative risk threshold to determine which, if any, flight paths of flight paths 106 can be used for performing a mission. For example, only the flight paths 106 having a total cumulative risk below the total cumulative risk threshold can be determined to be available for performing a mission.

Additionally, the total cumulative risk for each flight path 106 can be used to determine which flight path of flight paths 106 has the lowest associated relative total cumulative risk. For example, for source location and delivery destination pairs that have more than one available flight path, the total cumulative risk for each flight path can be determined and compared against each other. Accordingly, the flight path with the lowest total cumulative risk can be selected as the preferred flight path. Alternatively and/or in addition, the total cumulative risk for each flight path may be incrementally determined (e.g., for portions of flight paths 106), as described in connection with FIG. 2. Further, in implementations where the total cumulative risk is incrementally determined, at each increment where the incremental total cumulative risk is determined, it can be compared against a corresponding incremental total cumulative risk threshold value to ensure that the total cumulative risk remains below an acceptable value.

With respect to FIG. 1, flight paths 106-A3 and 106A-4 may be available for the source location and delivery destination pair including source location 102-A and delivery destination 104-2. Accordingly, after determination of the total cumulative risks associated with each of flight paths 106-A3 and 106-A4, the flight path having the lower total cumulative risk can be selected as the preferred flight path. Similarly, with respect to delivery destination 104-6, flight paths 106-B4, 106-B5, and 106-B6 may be available for the source location and delivery destination pair including source location 102-B and delivery destination 104-6. Accordingly, after determination of the total cumulative risks associated with each of flight paths 106-B4, 106-B5, and 106-B6, the flight path having the lower total cumulative risk can be selected as the preferred flight path. According to certain aspects, the selected preferred flight paths for each source location and delivery destination pair may be stored in a datastore. Optionally, the stored preferred flight paths may be stored in view of a time of day, day of week, day of the month, etc., as the total cumulative risk associated with each flight path 106 may vary as a function of time, based on the conditions presented at the time of day, day of week, day of the month, etc.

Similarly, for delivery destinations that can be serviced by more than one source location, the total cumulative risk associated with each flight path for servicing the delivery destination can be determined, and the flight path with the lowest relative total cumulative risk can be selected to service the delivery destination. For example, as shown in FIG. 1, delivery destination 104-7 can be serviced by source location 102-A via flight path 106-A6 and by source location 102-B via flight path 106-B3. Accordingly, the total cumulative risk associated with flight paths 106-A6 and 106-B3 can be determined, and the flight path having the lower total cumulative risk can be selected as the preferred flight path to service delivery destination 104-7, and the corresponding source location can be consequently determined to be the preferred source location for delivery destination 104-7.

Figure 2:
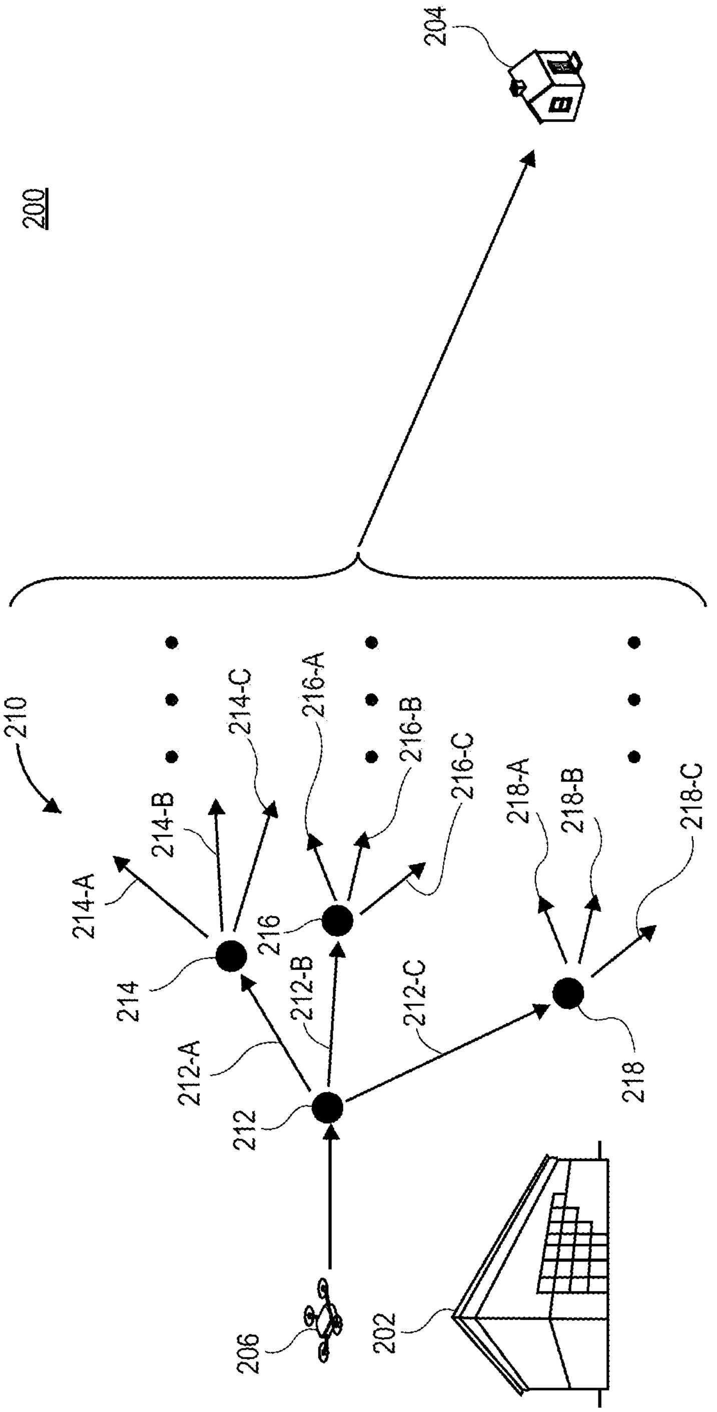
FIG. 2 illustrates an exemplary nodal diagram illustrating an exemplary risk-weighted model, according to embodiments of the present disclosure.

According to exemplary embodiments of the present disclosure, the preferred flight path presenting the lowest relative total cumulative risk can be determined incrementally using the risk-weighted model. FIG. 2 shows an exemplary nodal diagram 200 illustrating an exemplary risk-weighted model (e.g., a weighted four-dimensional nodal graph, etc.) of the environment from source location 202 to delivery destination 204, according to embodiments of the present disclosure.

FIG. 2 shows an exemplary nodal diagram 200 illustrating a risk-weighted model (e.g., a weighted four-dimensional graph of a plurality of potential flight paths, etc.) predicting the total cumulative risk of the environment from source location 202 to delivery destination 204 in which vehicle 206 may operate in performing a mission and/or delivery from source location 202 to delivery destination 204. In FIG. 2, the model can include a weighted four-dimensional graph, where the weighting can represent the total cumulative risk along any of the flight paths along the weighted four-dimensional graph represented by nodal diagram 200. For example, each of the flight paths may be defined by a plurality of nodes 212, 214, 216, 218, and an incremental total cumulative risk may be associated with each of nodes 212, 214, 216, 218 such that a total cumulative risk for each respective flight path can be determined as vehicle 206 travels between the various nodes 212, 214, 216, 218.

Accordingly, vehicle 206 may follow any of the flight paths defined by traversal through the various nodes 212, 214, 216, 218, and, as vehicle 206 travels along each respective flight path, a total cumulative risk can be incrementally determined. As shown in FIG. 2, from node 212, any of flight paths 212-A, 212-B, or 212-C may be selected, which would in turn lead to node 214, 216, or 218, respectively. From node 214, any of flight paths 214-A, 214-B, or 214-C may be selected. Similarly, from node 216, any of flight paths 216-A, 216-B, or 216-C may be selected, and from node 218, any of flight paths 218-A, 218-B, or 218-C may be selected, and so on. Nodal diagram 200 can include any number of nodes and any number of flight paths originating from and/or leading to each respective node.

Accordingly, as vehicle 206 travels between the various nodes 212, 214, 216, 218, a total cumulative risk can be incrementally determined in view of the incremental total cumulative risk associated with each possible flight path associated with each of nodes 212, 214, 216, and/or 218. For example, from node 212, a total cumulative risk can be determined for each of flight paths 212-A, 212-B, and 212-C. The risks determined for flight paths 212-A, 212-B, and 212-C compared against one another, and the flight path with the lowest total cumulative risk can be selected. For example, if, from node 212, it is determined that flight path 212-B includes the lowest total cumulative risk (out of flight paths 212-A, 212-B, and 212-C), flight path 212-B can be selected as the flight path from node 212, which leads to node 216. From node 216, the total cumulative risks for flight paths 216-A, 216-B, and 216-B can then be determined, and the flight path with the lowest cumulative risk from node 216 can be selected. This process can be incrementally and iteratively performed until delivery destination 204 is reached. According to certain aspects of the present disclosure, a stepwise search algorithm approach such as the A* algorithm, Dijkstra's Algorithm, a greedy best first search algorithm, gradient descent algorithm, etc. can be applied to determine a preferred flight path. For example, the A* algorithm can be applied to stepwise determine a preferred flight path (e.g., a lowest relative total cumulative risk, etc.). Alternatively and/or in addition, a gradient descent algorithm can be applied to determine a partial derivative associated with each flight path and can be iterated on each path to find a preferred flight path. According to other aspects of the present disclosure, the weights can incorporate other factors, such as energy cost, time cost, financial cost, etc.

According to certain aspects of the present disclosure, at each interval where an incremental determination of the total cumulative risk may be performed (e.g., at nodes 212, 214, 216, and/or 218), the incremental total cumulative risk can be compared against a corresponding incremental total cumulative risk threshold value to ensure that the total cumulative risk remains below an acceptable value. For example, as described herein, a total cumulative risk threshold value can first be determined. This can include, for example, a total cumulative risk threshold value for a round-trip mission flight path, an outbound flight path, an inbound flight path, etc. The total cumulative risk threshold value can then be divided such that a corresponding proportion of the total cumulative risk threshold value can be assigned to each interval (e.g., nodes 212, 214, 216, and/or 218). For example, a simple linear relationship can be ascribed between the total cumulative risk threshold (e.g., a constant direct relationship between the total cumulative risk threshold value vs. time or distance) and each interval can be assigned an equal respective proportion of the total cumulative risk threshold value. Alternatively, the total cumulative risk threshold value can be proportionally assigned to each interval (e.g., earlier intervals are assigned a lower proportion of the total cumulative risk threshold value and later intervals are assigned a higher proportion of the total cumulative risk threshold value since risk generally increases with an increase in flight time).

Figure 3:
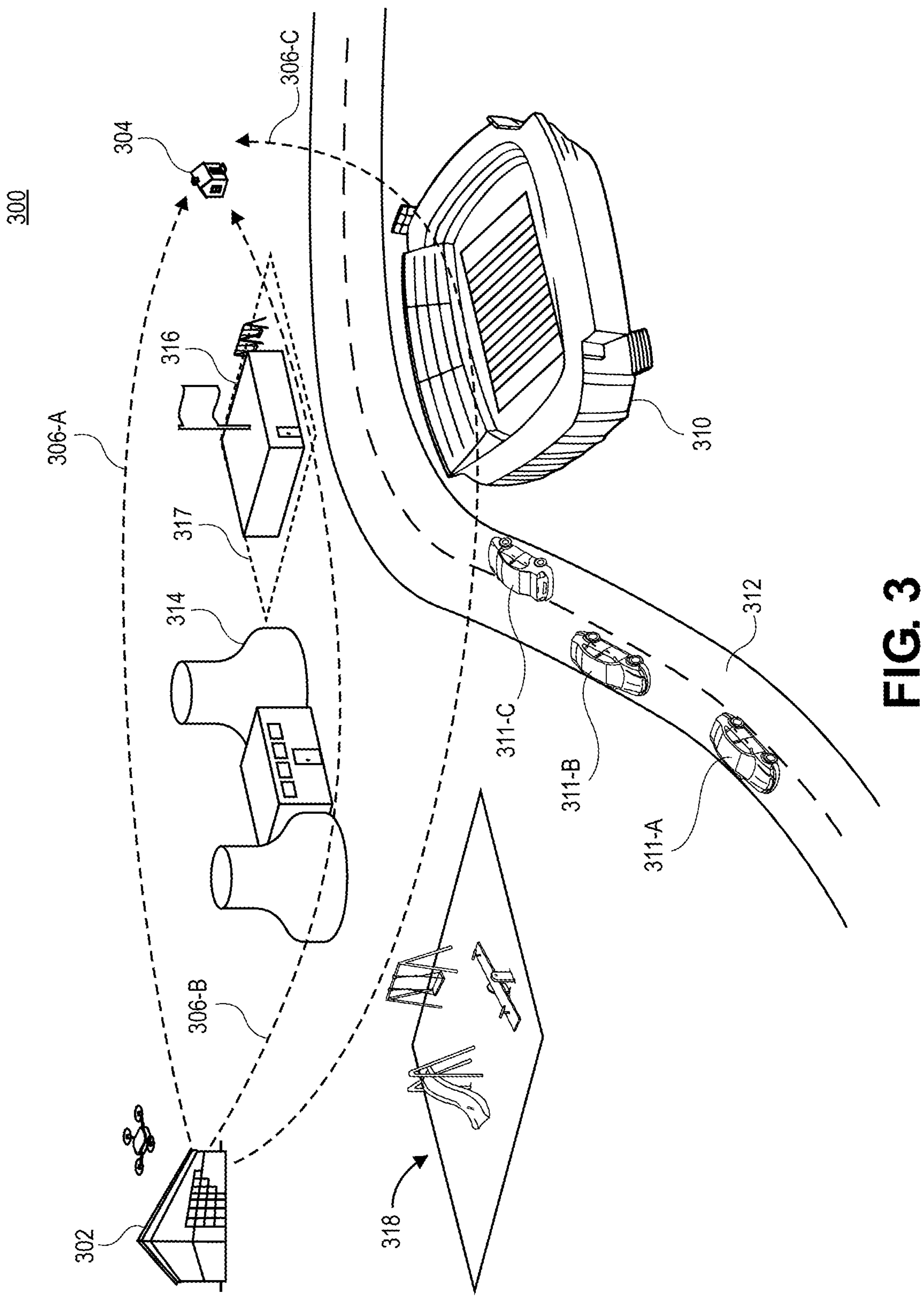
FIG. 3 illustrates an exemplary environment with exemplary flight paths between source locations and delivery destinations, according to embodiments of the present disclosure.

FIG. 3 shows an illustration of an exemplary environment 300 according to exemplary embodiments of the present disclosure. For example, exemplary environment 300 illustrates certain features that may contribute to determination of ground risk in connection with a plurality of flight paths.

As shown in FIG. 3, flight paths 306-A, 306-B, and 306-C can represent certain flight paths between source location 302 and delivery destination 304. Although three flight paths 306-A, 306-B, and 306-C are shown in FIG. 3, any number of flight paths between source location 302 and delivery destination 304 may exist and/or be considered.

As shown in FIG. 3, certain exemplary features, such as stadium 310, roadway 312, (with cars 311-A, 311-B, and 311-C traveling on roadway 312), nuclear plant 314, school 316 with perimeter 317, and/or park 318 may present certain ground risks to any of flight paths 306-A, 306-B, and/or 306-C passing over any of stadium 310, roadway 312, cars 311-A, 311-B, and 311-C, nuclear plant 314, and/or school 316. For example, nuclear plant 314 may be categorized as a sensitive structure, as a vehicle failure resulting in a crash with nuclear plant 314 may result in a higher probability of resulting human injury or harm. Further, risks may be dependent on whether the feature is categorized as a covered or an uncovered feature. For example, school perimeter 317, which may include playgrounds, fields, etc. and park 318 may be categorized as uncovered features (e.g., the populations are not protected by a structure such as a building), whereas school 316, an office building, etc. may be categorized as a covered structure. With respect to stadium 310, roadway 312 (with cars 311-A, 311-B, and 311-C traveling on roadway 312), and school 316, in addition to whether they may be categorized as covered or uncovered features, the probability of injury or harm to a person may be dependent on time. For example, roadway 312 may be more congested during certain times of the day and may include more cars 311. Accordingly, during the more congested times of the day, the ground risk presented by roadway 312 may be higher in view of the increased population density resulting from the increased number of cars 311. Similarly, the ground risk presented by school 316 may be higher during the times school is in session on school days and lower at other times. Stadium 310 may also present a higher ground risk during times events are scheduled (e.g., sporting events, concerts, etc.) and may present a lower ground risk at other times when the stadium may be empty.

Accordingly, certain flight paths may be available for missions at certain times of the day, days of the week, months of the year, seasons, etc. even if they are unavailable at other times. For example, after a total cumulative risk threshold has been determined, flight path 306-C may have an associated total cumulative risk above the total cumulative risk threshold during times events are being held at stadium 310, thereby rendering flight path 306-C unavailable at those times for performing missions. Alternatively, at times during which events are not being held at stadium 310, the total cumulative risk associated with flight path 306-C may be below the total cumulative risk threshold, thereby making flight path 306-C available for missions. Roadway 312 and school 316 may have similar effects on the total cumulative risk associated with flight paths passing over roadway 312 and school 316. For example, the total cumulative risk associated with flight paths passing over roadway 312 may be higher during times roadway 312 may typically be congested (e.g., rush hour, commute times, etc.) and lower during times roadway 312 is typically not congested. Similarly, the total cumulative risk associated with flight paths passing over school 316 may be higher during times that school is in session and lower during times school 316 is not in session. Determination of total cumulative risk, as well as ground risk, is described further in connection with FIG. 6.

According to certain exemplary embodiments of the present disclosure, if it is desired to perform a mission from source location 302 to delivery destination 304, a total cumulative risk associated with each of flight path 306-A, 306-B, and 306-C may first be determined. In determining the total cumulative risk, a ground risk may be determined to determine the probability of human injury or harm or damage based on the conditions on the ground along each of flight paths 306-A, 306-B, and 306-C. Further, each of stadium 310, roadway 312, cars 311-A, 311-B, and 311-C, nuclear plant 314, and/or school 316 may contribute to the ground risk associated with the flight paths 306 passing over each of stadium 310, roadway 312, cars 311-A, 311-B, and 311-C, nuclear plant 314, and/or school 316. Additionally, a vehicle risk associated with each flight path 306-A, 306-B, and 306-C may also be determined. After a total cumulative risk has been determined in connection with flight paths 306-A, 306-B, and 306-C, the flight path 306 having the lowest relative associated total cumulative risk may be selected and stored as the preferred flight path. According to certain aspects, the flight path 306 with the lowest relative total cumulative risk may change based on the time of day, day of the week, month of the year, season, etc. based on the conditions on the ground.

Figure 4A:
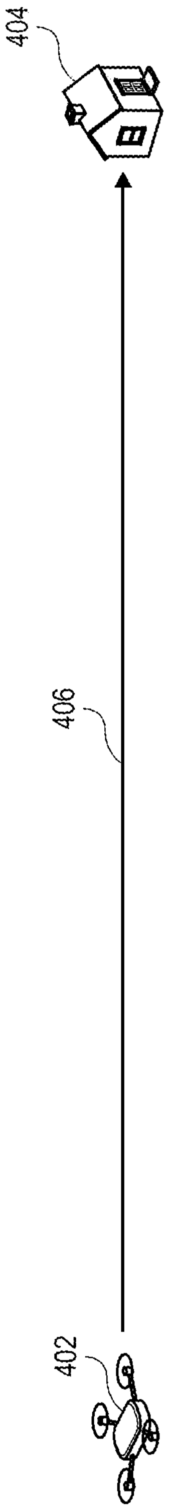
FIGS. 4A and 4B illustrate exemplary environments with exemplary flight paths between source locations and delivery destinations, according to embodiments of the present disclosure.
Figure 4B:
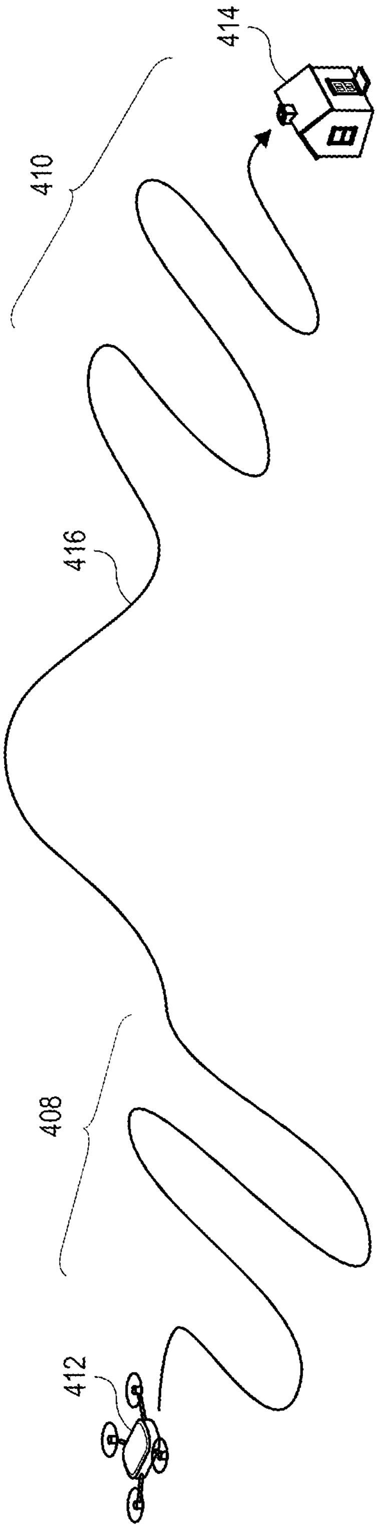

FIGS. 4A and 4B show illustrations of an exemplary flight paths 406 and 416 according to exemplary embodiments of the present disclosure. For example, flight paths 406 and 416 shown in FIGS. 4A and 4B illustrate certain features that may contribute to a determination of vehicle risk in connection with flight path 406 and 416.

As shown in FIG. 4A, flight path 406 may represent a flight path vehicle 402 may follow when performing a mission (e.g., a delivery, etc.) to delivery destination 404. Flight path 406 may represent a relatively short, direct, straight-line flight path for vehicle 402 to follow to delivery destination 404. Accordingly, although flight path 406 may define certain flight parameters (e.g., altitude, speed, heading, etc.), given that flight path 406 is substantially straight and direct, vehicle 402 may not be required to make various maneuvers, such as turns, altitude changes, etc., as it flies along flight path 406 to delivery destination 404. Accordingly, a vehicle risk presented by flight path 406 may be lower than a vehicle risk presented by a more challenging flight path having many curves, changes in altitude, changes in speed, maneuvers through tight spaces, etc. It should be noted, however, that vehicle risk generally increases the longer a vehicle is in flight. Accordingly, the vehicle risk presented at the beginning of flight path 406 may be less than the vehicle risk presented at the end of flight path 406. Nevertheless, the vehicle risk can represent the probability of a vehicle failure while flying flight path 406. Accordingly, the condition, state, projected vehicle performance in view of the flight path, history, etc. of vehicle 402 (e.g., time of operation, time since last maintenance, weight of item/payload, etc.) may contribute to the vehicle risk associated with the operation of a vehicle along flight path 406.

FIG. 4B illustrates flight path 416 that vehicle 412 may follow in performing a delivery and/or mission to delivery destination 414. Flight path 416 can represent one of many flight paths that vehicle 412 may be able to follow in performing a mission to delivery destination 414. As shown in FIG. 4B, flight path 416 can include various elevational changes, various turns/curves, maneuvers around a mountain, etc. Compared to flight path 406, which is shown in FIG. 4A to be relatively straight and direct without navigation around any obstacles or structures, flight path 416 may present a higher vehicle risk, as the maneuvers required by flight path 416, and navigation along flight path 416, may be more difficult, thereby presenting a greater probability of vehicle failure.

Additionally, the condition, state, projected vehicle performance in view of the flight path, history, payload size/weight, etc. of vehicle 412 (e.g., time of operation, time since last maintenance, etc.) may also contribute to the vehicle risk associated with the operation of a vehicle along flight path 416. For example, a vehicle type that is more nimble and predicted to provide better performance under the conditions presented by flight path 416 may present a lower vehicle risk when compared with a vehicle type that may not be expected to perform as well in performing the maneuvers required by flight path 416. Additionally, flight path 416 may require a longer flight duration and increased energy consumption when compared to flight path 406, which may also present a higher associated vehicle risk. Further, as noted in connection with flight path 406, vehicle risk generally increases the longer a vehicle is in flight. Accordingly, the vehicle risk presented by maneuvers, such as turns 408, performed at the beginning of flight path 416 may be less than the vehicle risk presented by similar maneuvers, such as turns 410, performed towards the end of flight path 416. Determination of total cumulative risk, as well as vehicle risk, is described further in connection with FIG. 6.

Figure 5:
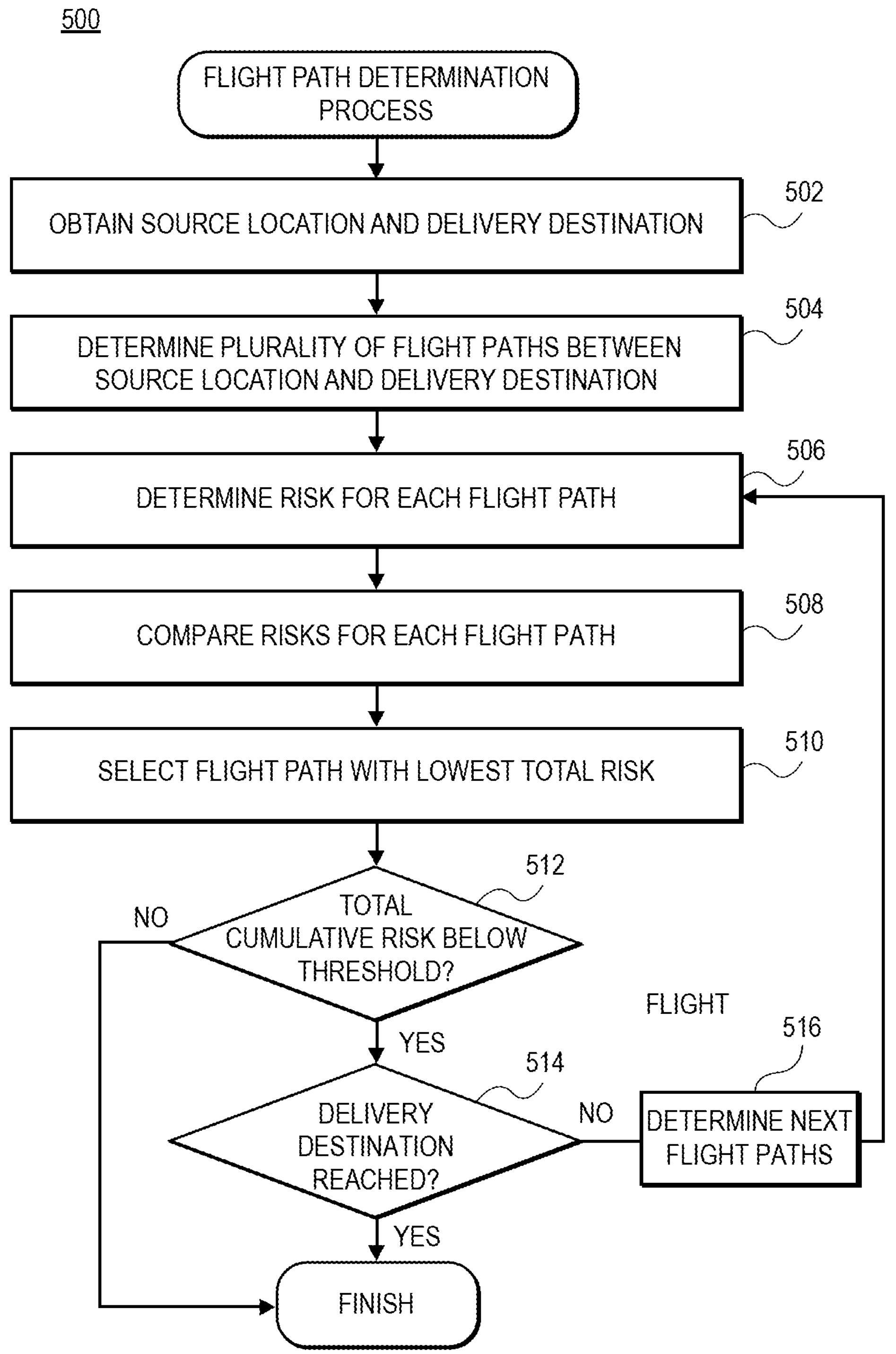
FIG. 5 is a flow diagram of an exemplary flight path determination process, according to embodiments of the present disclosure.

FIG. 5 is a flow diagram of an exemplary process 500 for determining a flight path, according to exemplary embodiments of the present disclosure. Process 500 can be used, for example, to determine a flight path (e.g., one of flight paths 106) between a source location (e.g., one of source locations 102) and a delivery destination (e.g., one of delivery destinations 104) for performing a delivery and/or a mission.

As shown in FIG. 5, process 500 can begin with a determination of a source location (e.g., source location 102) and a delivery destination (e.g., delivery destination 104) can be determined, as in step 502. The source location and the delivery destination can be any two locations between which it may be desirable to perform a mission (e.g., delivery of an item, etc.) by a vehicle, such as an aerial vehicle (e.g., a UAV, etc.). After the source location and the delivery destination have been determined, a plurality of flight paths (e.g., flight paths 106, etc.) between the source location and the delivery destination can be determined, as in step 504. According to embodiments, determination of the flight paths may include the determination of a plurality of flight paths between intermediary points between the source location and the delivery destination (e.g., a portion or a segment of a mission flight path between the source location and the delivery destination such that the total cumulative risk for a mission flight path can be determined incrementally, as described with respect to FIG. 2). The flight paths between the source location and delivery destination can include, for example, the shortest and most direct route between the source location and the delivery location, a route that passes over areas having the lowest relative population densities, routes that avoid restricted airspace, routes that avoid other sensitive structures, or any other route connecting the source location and the delivery destination.

For each flight path, the total cumulative risk can be determined, as in step 506. Determination of the total cumulative risk for each flight path is described in further detail in connection with FIGS. 2 and 6. For example, according to certain aspects of the present disclosure, the total cumulative risk of a flight path can, as described in connection with FIG. 2, be incrementally determined using a stepwise search algorithm such as the A* algorithm, Dijkstra's Algorithm, a greedy best first search algorithm, gradient descent algorithm, etc.

In step 508, the risks for each flight path determined in step 506 can be compared. For example, for a given position of an aerial vehicle performing a mission between the source location and the delivery destination, the risk associated with each potential flight path from that position can be determined and compared against one another. In step 510, the flight path with the lowest total risk may be selected. Optionally, additional factors, in addition to the total cumulative risk associated with a flight path, may be considered in the determination of a flight path for performing a mission. For example, additional considerations may include number and/or type of available vehicles, length of time required to perform the mission using the flight path, economics associated with the flight path, etc. Certain flight paths may present an acceptable total cumulative risk but may include other considerations that may make the flight path unavailable or "unviable." For example, requirements of the mission may require that all deliveries be performed within 30 min, or 1 hour, etc., and certain flight paths may, although within an acceptable range or total cumulative risk, require 2 hours to complete the mission. Alternatively, the economics associated with certain flight paths (e.g., the cost of performing the mission along the flight path, etc.) may be too high, even if the total cumulative risk associated with the flight path is within an acceptable range.

Also optionally, in step 512, it can be determined whether the total cumulative risk associated with a flight path is below the total cumulative risk threshold. This comparison can determine whether the flight path can be an available or "viable" flight path for performing a mission in view of the total cumulative risk associated with the flight path. For example, a source location and delivery destination pair having a flight path with a total cumulative risk below the total cumulative risk threshold can facilitate performing missions, such as aerial delivery of an item, between the source location and delivery destination pair, whereas a source location and delivery destination pair only having flight paths with a total cumulative risk above the total cumulative risk threshold may result in the inability to perform missions (e.g., aerial delivery of an item, etc.) for such source location and delivery destination pairs. Accordingly, in determining whether each flight path is below the total cumulative risk threshold, the incremental total cumulative risk can be compared against a corresponding incremental total cumulative risk threshold (corresponding to the vehicle's position) to ensure that the total cumulative risk remains below an acceptable value. For example, as described herein, a total cumulative risk threshold value can then be divided such that a corresponding proportion of the total cumulative risk threshold value can be assigned to each interval, and a comparison of the total cumulative risk and the corresponding total cumulative risk threshold value for that increment can be compared. Accordingly, for flight paths having a total cumulative risk above the total cumulative risk threshold, the process may finish. Otherwise, it can be determined whether the delivery destination has been reached (step 514), and in the event the delivery destination has not yet been reached, the next flight paths can be determined, as in step 516, and the process can be iteratively repeated to incrementally determine the total cumulative risk until the delivery destination is reached.

Figure 6:
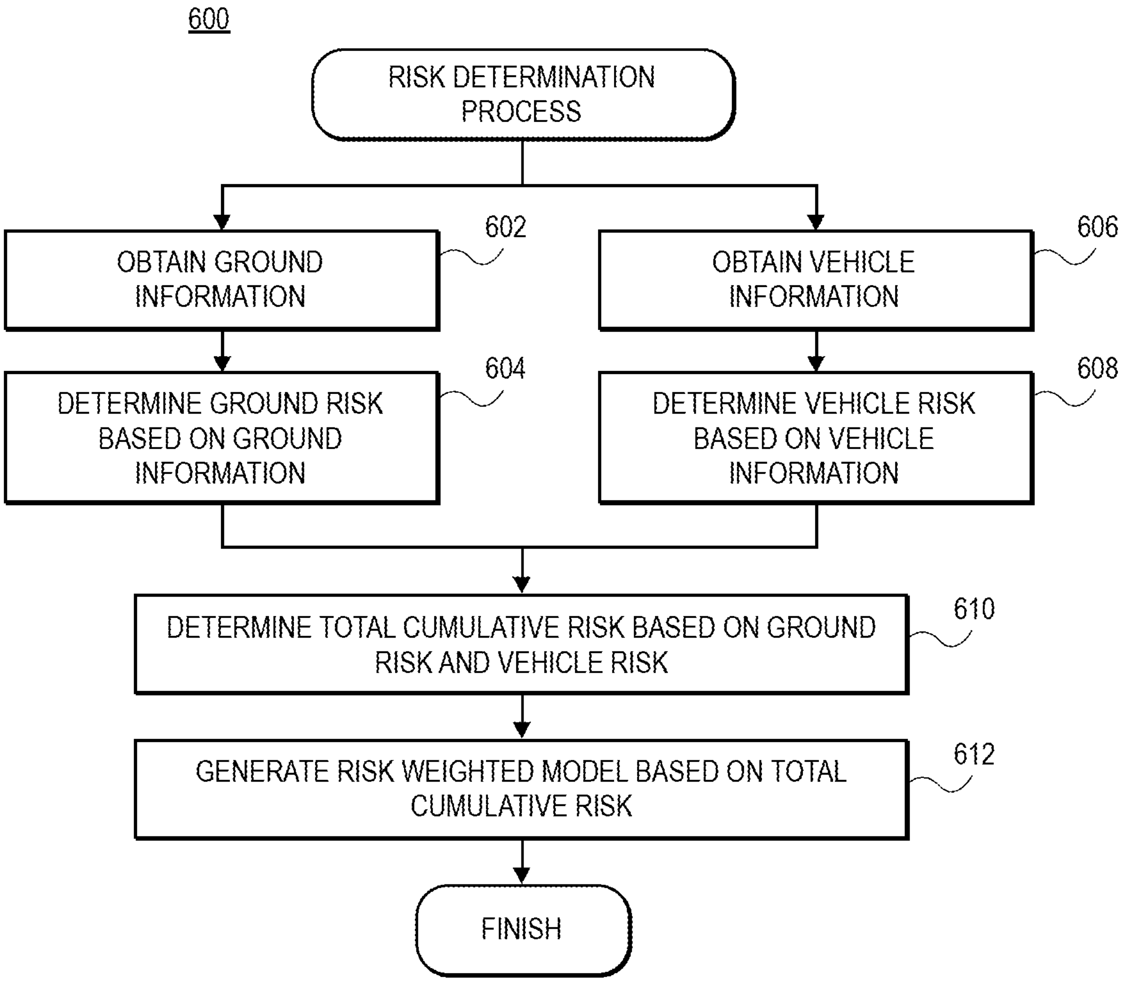
FIG. 6 is a flow diagram of an exemplary total cumulative risk determination process, according to embodiments of the present disclosure.

FIG. 6 is a flow diagram of an exemplary process 600 for determining a total cumulative risk, according to exemplary embodiments of the present disclosure. Process 600 can, for example, illustrate further details of step 506, where a total cumulative risk for each flight path can be determined.

According to certain exemplary embodiments of the present disclosure, the total cumulate risk can include a ground risk and a vehicle risk. The ground risk can represent the probability of human harm or injury and/or damage. Accordingly, in step 602, ground information can be obtained, which can be used to determine a ground risk in step 604. In determining the ground risk, the ground information obtained in step 602 can indicate conditions on the ground over which the flight path may pass. For example, ground information that can be used to determine ground risk can include population density, sensitive structures and/or areas, events affecting population density (e.g., scheduled sporting events, concerts, other gatherings, time of day, etc.), etc. According to certain aspects of the present disclosure, ground information can also include real-time sensor information obtained by a vehicle as it is performing a mission along the flight path (e.g., unexpected traffic, unexpected gathering, etc.).

In addition to determining a ground risk, vehicle risk can also be determined. The vehicle risk can represent the probability of experiencing a vehicle failure while the mission is being performed along the flight path. Accordingly, in step 606, vehicle information can be obtained, which can be used to determine a vehicle risk in step 608. In determining the vehicle risk, the vehicle information obtained in step 606 can include vehicle parameters and characteristics that may be relevant in view of the flight path to be flown. For example, vehicle information that can be used to determine vehicle risk can include vehicle type, performance characteristics associated with the vehicle (e.g., propulsion, acceleration, range, payload capacity, etc.), weight of payload/item to be delivered, time of operation, time since last maintenance, length of flight, difficulty of maneuvers presented by the flight path (e.g., changes in altitude, velocity, rate of energy consumption, turns, maneuvering through tight spaces and near structures), etc. According to certain aspects of the present disclosure, ground information can also include real-time sensor information obtained by the vehicle as it is performing a mission along the flight path (e.g., vehicle performance, etc.). As shown in FIG. 6, determination of ground risk and vehicle risk can be performed in parallel. Alternatively, determination of ground risk and vehicle risk can be performed serially (e.g., in either sequence).

After the ground risk and the vehicle risk have been determined, a total cumulative risk associated with the flight path can be determined, as in step 610. For example, the total cumulative risk can be the integral of the product of the ground risk and the vehicle risk over time. Based on the total cumulative risk, a risk weighted model of the environment in which the vehicle may operate performing a mission between the source location and the delivery destination may be generated (step 612). According to certain aspects, the risk-weighted model can be, for example, a risk weighted four-dimensional graph specifying the incremental risk at a given position defined by the latitude, longitude, altitude, and time. The risk weighted model can be used, for example, to incrementally determine a total cumulative risk along potential flight paths between a source location and a delivery destination. According to certain aspects of the present disclosure, the weighted graph can incorporate additional factors (e.g., energy cost, time cost, financial cost, etc.) in determining the respective weights.

Figure 7A:
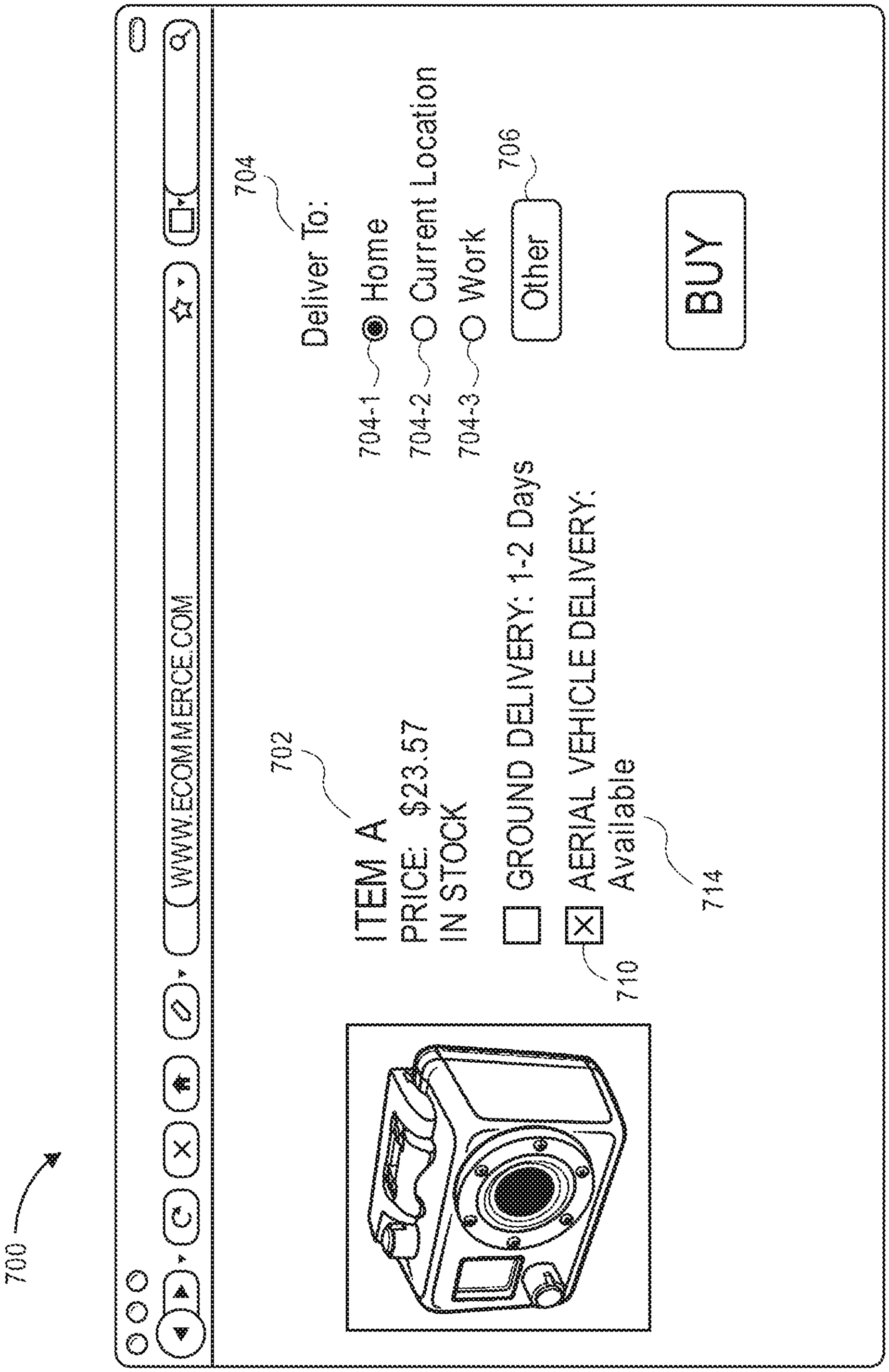
FIGS. 7A and 7B are illustrations of exemplary electronic commerce website pages, according to embodiments of the present disclosure.
Figure 7B:
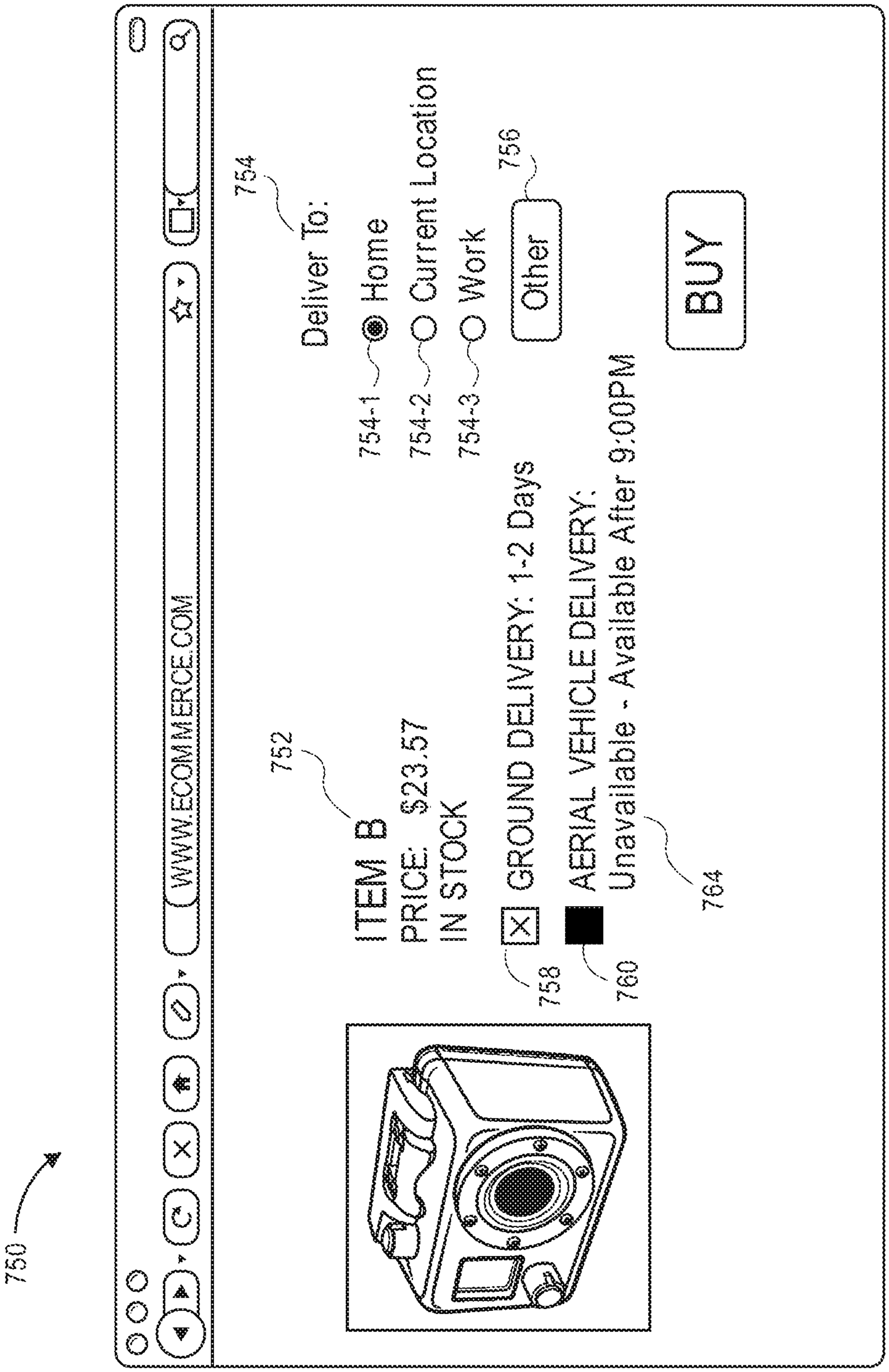

FIGS. 7A and 7B are illustrations of exemplary electronic commerce website pages 700 and 750, according to exemplary embodiments of the present disclosure.

As shown in FIG. 7A, website page 700 shows that aerial delivery is available for Item A 702, and, as shown in FIG. 7B, website page 750 shows that aerial delivery is not available for Item B 752. Pages 700 and 750 may include information about the item, such as the item price, whether the item is in stock, etc. Likewise, a user viewing the page 700 or 750 may specify a delivery destination 704 and 754. According to certain aspects of the present disclosures, the user may be recognized when the user first requests page 700 or 750 and a default or preferred delivery destination, such as Home 704-1 and 754-1, may be selected as the delivery destination. The user may select a different delivery destination, such as Current Location 704-2 and 754-2, Work 704-3 and 754-3, or specify a different delivery destination by selecting the Other control 706 and 756. The presented delivery destinations such as Home 704-1 and 754-1 and Work 704-3 and 754-3 may correspond to a specific location previously specified by the user or otherwise determined by the user. The delivery destination of Current Location 704-2 and 754-2 may be determined based on position information provided by one or more devices associated with the user. For example, current position information, such as global positioning system (GPS) data, may be provided by a portable device (e.g., cellular phone, wearable, watch, etc.) associated with the user. The position information may then be utilized as the Current Location delivery destination for the user. Finally, any other delivery location (e.g., address, coordinate, etc.) may be specified by the user.

If a default delivery address can be determined for the customer, and/or upon receiving a selection of a delivery destination, in accordance with embodiments of the present disclosure, a total cumulative risk associated with various flight paths between one or more source locations at which inventory that includes the item is maintained and the delivery destination may be determined. For example, when a user visits an electronic commerce website, the user may be identified (e.g., based on cookies, user login credentials, etc.) and a default delivery destination determined for the identified user. When the user submits a request to view a webpage for an item, such as webpage 700 or 750 for Item A 702 or 752, source locations at which the item is stored in inventory can be determined, and flight paths between those source locations and the delivery destination can be identified. Next, a total cumulative risk for each of the flight paths can be determined and compared against a total cumulative risk threshold. Alternatively and/or in addition, a preferred flight path can be determined using a weighted graph and an incremental, stepwise search algorithm, and the total cumulative risk for the preferred flight path can be compared against the total cumulative risk threshold.

If any of the identified flight paths (or the preferred flight path) includes a total cumulative risk below the total cumulative risk threshold, the availability of aerial vehicle delivery can be indicated in the displayed delivery options 714 and the radio box 710 for aerial vehicle delivery can be selected, as shown in FIG. 7A. Alternatively and/or in addition, if the total cumulative risks for all the identified flight paths (or the preferred flight path) exceed the total cumulative risk threshold, aerial delivery of the item can be indicated to be unavailable as delivery option 754, and the radio box 760 may be unavailable for selection, as shown in FIG. 7B. Accordingly, radio button 758 associated with ground delivery may be selected in view of the unavailability of aerial vehicle delivery. Optionally, if it is determined that the total cumulative risk is currently elevated based on a time dependent factor (e.g., an event scheduled to end by a certain time, rush hour traffic on an interstate highway, etc.), it can be determined whether the total cumulative risk for at least one flight path will likely fall to a value below the total cumulative risk threshold after mitigation of the time dependent factor (e.g., the event has ended, rush hour traffic has cleared, etc.). Accordingly, as shown in FIG. 7B, delivery option 754 may include an indication of an estimated timeframe during which aerial vehicle delivery may be available (e.g., after the time dependent factor has concluded).

Figure 8:
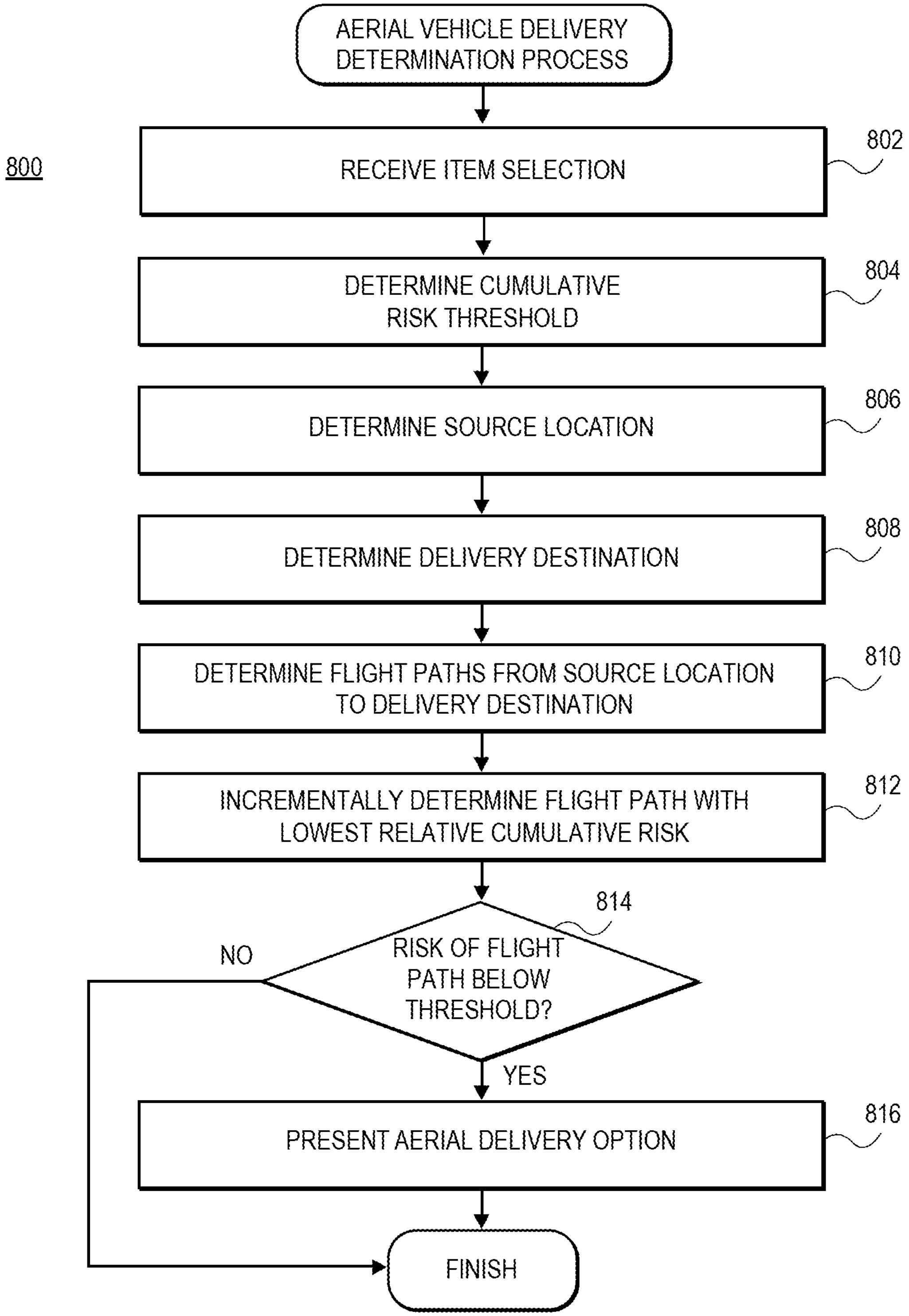
FIG. 8 is a flow diagram of an exemplary aerial vehicle delivery determination process, according to embodiments of the present disclosure.

FIG. 8 is a flow diagram of an exemplary aerial vehicle delivery option determination process 800, in accordance with implementations of the present disclosure. The example process 800 begins upon receipt of an item selection, as in 802. An item selection may be, for example, a request by a user's computing device to view a web page corresponding to an item, a request from a merchant corresponding to an item of the merchant delivered by a service, etc.

In step 804, a total cumulative risk threshold can be determined. For example, a total cumulative risk threshold can be established to determine a level of "acceptable" risk for a performing a delivery. For example, a baseline amount of risk of causing human harm or injury and/or damage from a vehicle failure (e.g., on the ground and to the vehicle, etc.) that may be deemed "acceptable" can first be determined. Based on the baseline risk, a threshold value of the total cumulative risk can be extrapolated from the baseline value of the "acceptable" risk. The total cumulative risk threshold can be established by law, regulations, an organization, or any combination thereof.

Upon receipt of an item selection, one or more source locations at which the item is stored in inventory can be determined, as in step 806. This can include, for example, any materials handling facility (e.g., warehouse, fulfillment center, retail location, etc.) from which the item may be delivered. In step 808, a delivery destination for the item can be determined. For example, when a user visits an electronic commerce website, the user may be identified (e.g., based on cookies, user login credentials, etc.) and the user may have a certain delivery destination specified for the user, such as home, work, etc. saved or specified. Alternatively and/or in addition, the user may specify a different delivery destination and/or provide his/her current location (e.g., using position information, such as global positioning system (GPS) data, from a device associated with the user, etc.).

In step 810, flight paths from the source location to the delivery destination can be determined, and a total cumulative risk for the flight path with the lowest relative total cumulative risk can be incrementally determined, as in step 812. In step 814, the total cumulative risks determined for the flight path with the lowest relative total cumulative risk can be compared against the total cumulative risk threshold. If the total cumulative risk for at least one of the flight paths is below the total cumulative risk threshold, then the aerial delivery option can be presented to the user (e.g., via website page 700). If none of the total cumulative risks associated with any of the flight paths is below the total cumulative risk threshold, the process ends without presenting a user with the aerial delivery option.

Figure 9:
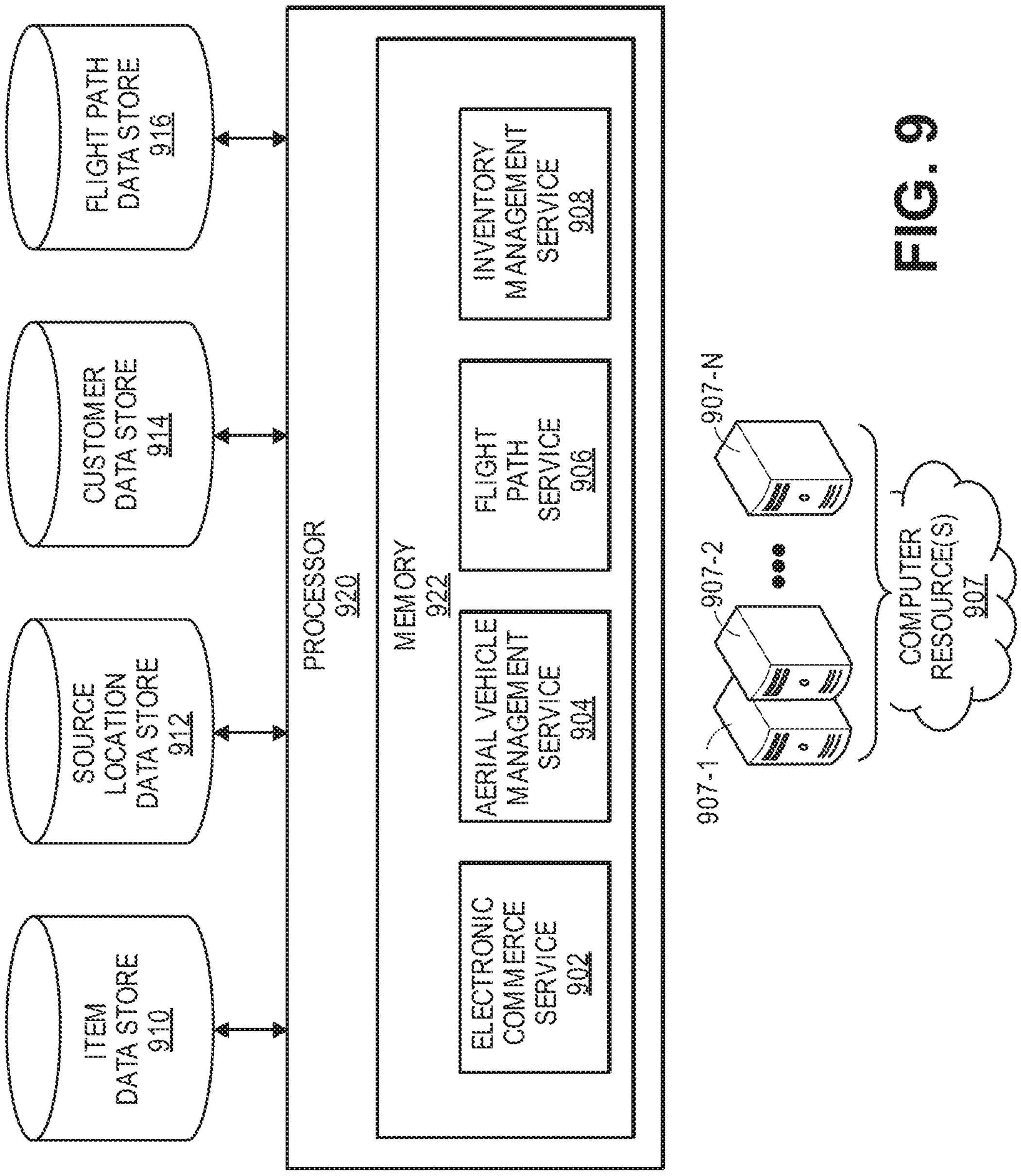
FIG. 9 is a block diagram of an exemplary system for managing flight operations, according to embodiments of the present disclosure.

FIG. 9 is a block diagram of components of one computing resource 907 that may perform or provide the systems and methods, according to exemplary embodiments of the present disclosure. Computing resources 907 may form a portion of a network-accessible computing platform implemented as a computing infrastructure of processors, storage, software, data access, and other components that is maintained and accessible via a network, such as the Internet. Services, such as electronic commerce service 902, the aerial vehicle management service 904, flight path service 906, and/or inventory management service 908 enabled by the computing resources 907, do not require that customers and/or other sellers have knowledge of the physical location and configuration of the computer resources 907 that deliver the services. Customers may utilize one or more computing devices, such as computers, laptops, tablets, smartphones, and/or other hardware or software to communicatively couple to the computing resources 907 via a network which may represent wired technologies (e.g., wires, USB, fiber optic cable, etc.), wireless technologies (e.g., RF, cellular, satellite, Bluetooth, etc.), and/or other connection technologies. Likewise, the aerial vehicles discussed herein, and illustrated by example in FIG. 10, may be configured or capable of communicating with the computing resources 907 via a network.

As illustrated, the remote computing resources 907 may include one or more servers, such as servers 907-1, 907-2, 907-3 . . . 907-N. These servers 907-1-907-N may be arranged in any number of ways, such as server farms, stacks, and the like, that are commonly used in data centers. Furthermore, the servers 907-1-907-N may include one or more processors 920 and memory 922 which may store the electronic commerce service 902, aerial vehicle management service 904, flight path service 906 and/or the inventory management service 908 and execute one or more of the processes or features discussed herein.

The electronic commerce service 902 may include one or more components that operate to perform one or more of the processes or features described herein. For example, the electronic commerce service 902 may include and/or manage a website that includes multiple webpages that offer items for sale, lease, rental, borrowing, etc. Alternatively, or in addition thereto, the electronic commerce service 902 may communicate with one or more of the aerial vehicle management service 904, flight path service 906, and/or the inventory management service 908 to facilitate one or more of the processes discussed herein.

The aerial vehicle management service 904 may be configured to communicate with each of a plurality of aerial vehicles to coordinate flights of the aerial vehicles, plan flight paths of the aerial vehicles, etc. The flight path service 906 may work in conjunction with the aerial vehicle management service 904, and may determine a total cumulative risk associated with various flight paths, determine a total cumulative risk threshold, maintain the flight path data store 916, as discussed herein, etc. The inventory management service may communicate with each source location and maintain inventory information for each source location. One or more of the electronic commerce service 902, the aerial vehicle management service 904, the flight path service 906, and/or the inventory management service 908 may also be configured to access one or more of the item data store 910, source location data store 912, customer data store 914, and/or the flight path data store 916.

The item data store 910 may store item information corresponding to items stored at various source locations. The item information may include, among other things, the dimensions of the items, the weight of the items, whether the item is eligible for item delivery, the fragility of the item, the source locations that maintain inventory of the item, etc. The source location data store 912 may include information corresponding to each source location including, but not limited to, the inventory items maintained at the source location, the number, size, and/or configuration of aerial vehicles, such as unmanned aerial vehicles operating from the source location, the geographic position of the source location, etc. The customer data store 914 may maintain information relevant to each customer, for example customers of the electronic commerce service 902. Customer information may include one or more designated delivery destinations, default delivery destinations, preferred modes of delivery, purchase history, etc. The flight path data store 916 may store preferred flight paths, total cumulative risks associated with certain flight paths, weighted graphs representing the incremental total cumulative risks, etc.

As will be appreciated, additional or fewer components may be included in the example computer resources 907 and the ones discussed herein are provided as examples and for discussion purposes only. For example, in some implementations, ordering service that manages customer orders may be included, and/or a payment service that manages payment for items requested by customers may be included in the computing resources 907. Likewise, in other implementations, some or all of the components may be combined into a single component.

Figure 10:
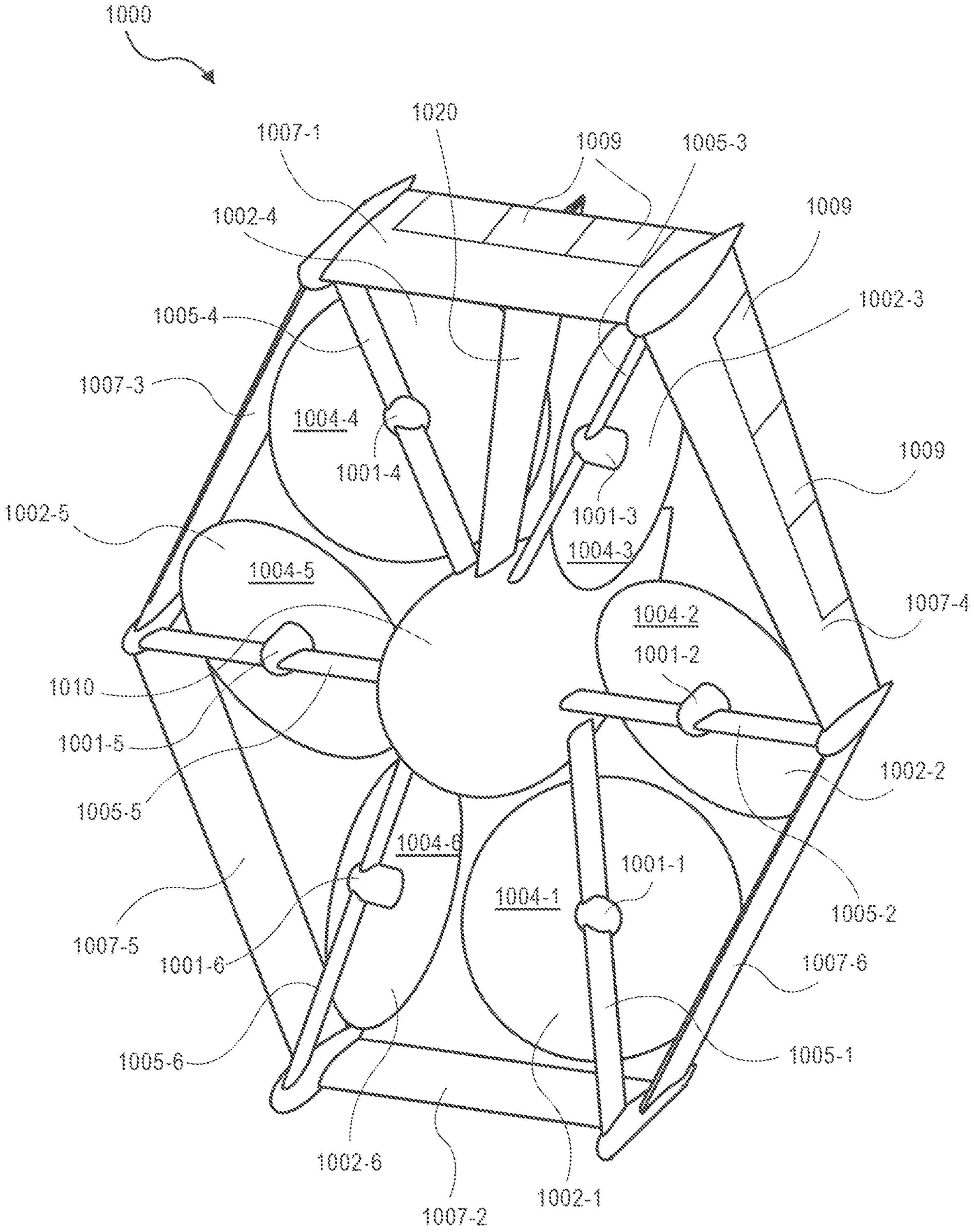
FIG. 10 is an exemplary aerial vehicle that may be utilized with the implementations described herein.

FIG. 10 illustrates a view of an exemplary aerial vehicle 1000, such as an unmanned aerial vehicle, that may be utilized with embodiments of the present disclosure.

As shown in FIG. 10, aerial vehicle 1000 includes six propulsion mechanisms 1002-1, 1002-2, 1002-3, 1002-4, 1002-5, and 1002-6 spaced about fuselage 1010 of aerial vehicle 1000. As illustrated, propulsion mechanisms 1002 include motors 1001-1, 1001-2, 1001-3, 1001-4, 1001-5, and 1001-6 and propellers 1004-1, 1004-2, 1004-3, 1004-4, 1004-5, and 1004-6. Likewise, some or all of the propulsion mechanism may include a SLMR apparatus, in accordance with the disclosed implementations. In selected implementations, propulsion mechanisms (e.g., 1002-1, 1002-2, 1002-3, 1002-4, 1002-5, and 1002-6) may be configured such that their individual orientations may be dynamically modified (e.g., change from vertical to horizontal flight orientation or any position therebetween). Likewise, the implementations of the SLMR apparatus described herein may be used to aid in reversal of the rotational direction of the drive shaft of the motor, thus providing the ability for the propulsion mechanism to generate thrust in either a positive direction or a negative direction.

In the implementation illustrated in FIG. 10, aerial vehicle 1000 also includes a ring wing 1007 having a substantially hexagonal shape that extends around and forms the perimeter of the aerial vehicle 1000. In the illustrated example, the ring wing has six sections or segments 1007-1, 1007-2, 1007-3, 1007-4, 1007-5, and 1007-6 that are joined at adjacent ends to form the ring wing 1007 around aerial vehicle 1000. Each segment of the ring wing 1007 has an airfoil shape to produce lift when the aerial vehicle is oriented as illustrated in FIG. 10 and moving in a direction that is substantially horizontal. As illustrated, the ring wing is positioned at an angle with respect to the fuselage 1010 such that the lower segment 1007-2 of the ring wing acts as a front wing as it is toward the front of the aerial vehicle when oriented as shown and moving in a horizontal direction. The upper segment 1007-1 of the ring wing, which has a longer chord length than the lower segment 1007-2 of the ring wing 1007, is farther back and thus acts as a rear wing.

The ring wing 1007 is secured to the fuselage 1010 by motor arms 1005. In this example, all six motor arms 1005-1, 1005-2, 1005-3, 1005-4, 1005-5, and 1005-6 are coupled to fuselage 1010 at one end, extend from fuselage 1010 and couple to ring wing 1007 at a second end, thereby securing ring wing 1007 to fuselage 1010. In other implementations, less than all of the motor arms may extend from fuselage 1010 and couple to the ring wing 1007. For example, motor arms 1005-2 and 1005-5 may be coupled to fuselage 1010 at one end and extend outward from the fuselage but not couple to ring wing 1007.

In some implementations, aerial vehicle 1000 may also include one or more stabilizer fins 1020 that extend from fuselage 1010 to ring wing 1007. Stabilizer fin 1020 may also have an airfoil shape. In the illustrated example, stabilizer fin 1020 extends vertically from fuselage 1010 to ring wing 1007. In other implementations, stabilizer fin 1020 may be at other positions. For example, stabilizer fin 1020 may extend downward from fuselage 1010 between motor arm 1005-1 and motor arm 1005-6.

In general, one or more stabilizer fins may extend from fuselage 1010, between any two motor arms 1005 and couple to an interior of ring wing 1007. For example, stabilizer fin 1020 may extend upward between motor arms 1005-3 and 1005-4, a second stabilizer fin may extend from the fuselage and between motor arms 1005-5 and 1005-6, and a third stabilizer fin may extend from the fuselage and between motor arms 1005-1 and 1005-2.

Likewise, while the illustrated example shows the motor arm extending from fuselage 1010 at one end and coupling to the interior of ring wing 1007 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of ring wing 1007, one or more stabilizer fins may extend from the interior of the ring wing 1007, one or more stabilizer fins may extend from fuselage 1010, and/or one or more stabilizer fins may extend from fuselage 1010 and couple to the interior of ring wing 1007.

Fuselage 1010, motor arms 1005, stabilizer fin 1020, and ring wing 1007 of aerial vehicle 1000 may be formed of any one or more suitable materials, such as graphite, carbon fiber, and/or aluminum.

Each of propulsion mechanisms 1002 are coupled to a respective motor arm 1005 (or propulsion mechanism arm) such that the propulsion mechanism 1002 is substantially contained within the perimeter of the ring wing 1007. For example, propulsion mechanism 1002-1 is coupled to motor arm 1005-1, propulsion mechanism 1002-2 is coupled to motor arm 1005-2, propulsion mechanism 1002-3 is coupled to motor arm 1005-3, propulsion mechanism 1002-4 is coupled to motor arm 1005-4, propulsion mechanism 1002-5 is coupled to motor arm 1005-5, and propulsion mechanism 1002-6 is coupled to motor arm 1005-6. In the illustrated example, each propulsion mechanism 1002-1, 1002-2, 1002-3, 1002-4, 1002-5, and 1002-6 is coupled at an approximate mid-point of the respective motor arm 1005-1, 1005-2, 1005-3, 1005-4, 1005-5, and 1005-6 between fuselage 1010 and ring wing 1007. In other implementations, some propulsion mechanisms 1002 may be coupled toward an end of the respective motor arm 1005. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 1010 or closer toward the ring wing 1007).

As illustrated, the propulsion mechanisms 1002 may be oriented at different angles with respect to each other. For example, propulsion mechanisms 1002-2 and 1002-5 are aligned with fuselage 1010 such that the force generated by each of propulsion mechanisms 1002-2 and 1002-5 is in-line or in the same direction or orientation as the fuselage. In the illustrated example, aerial vehicle 1000 is oriented for horizontal flight such that the fuselage is oriented horizontally in the direction of travel. In such an orientation, propulsion mechanisms 1002-2 and 1002-5 provide horizontal forces, also referred to herein as thrusting forces and act as thrusting propulsion mechanisms.

In comparison to propulsion mechanisms 1002-2 and 1002-5, each of propulsion mechanisms 1002-1, 1002-3, 1002-4, and 1002-6 are offset or angled with respect to the orientation of fuselage 1010. When aerial vehicle 1000 is oriented horizontally as shown in FIG. 10 for horizontal flight, propulsion mechanisms 1002-1, 1002-3, 1002-4, and 1002-6 may be used as propulsion mechanisms, providing thrust in a non-horizontal direction to cause aerial vehicle 1000 to pitch, yaw, roll, heave and/or sway. In other implementations, during horizontal flight, propulsion mechanisms 1002-1, 1002-3, 1002-4, and 1002-6 may be disabled such that they do not produce any forces and aerial vehicle 1000 may be propelled aerially in a horizontal direction as a result of the lifting force from the aerodynamic shape of ring wing 1007 and the horizontal thrust produced by thrusting propulsion mechanisms 1002-2 and 1002-5.

In some implementations, one or more segments of the ring wing 1007 may include ailerons, control surfaces, and/or trim tabs 1009 that may be adjusted to control the aerial flight of aerial vehicle 1000. For example, one or more ailerons, control surfaces, and/or trim tabs 1009 may be included on upper segment 1007-1 of ring wing 1007 and/or one or more ailerons, control surfaces, and/or trim tabs 1009 may be included on side segments 1007-4 and/or 1007-3. Further, one or more ailerons, control surfaces, and/or trim tabs 1009 may also be included on one or more of the remaining segments 1007-2, 1007-5, and 1007-6. The ailerons, control surfaces, and/or trim tabs 1009 may be operable to control the pitch, yaw, and/or roll of the aerial vehicle during horizontal flight when aerial vehicle 1000 is oriented as illustrated in FIG. 10.

The angle of orientation of each propulsion mechanism 1002-1, 1002-2, 1002-3, 1002-4, 1002-5, and 1002-6 may vary for different implementations. Likewise, in some implementations, the offset of propulsion mechanisms 1002-1, 1002-2, 1002-3, 1002-4, 1002-5, and 1002-6 may each be the same, with some oriented in one direction and some oriented in another direction, may each be oriented different amounts, and/or in different directions.

Figure 11:
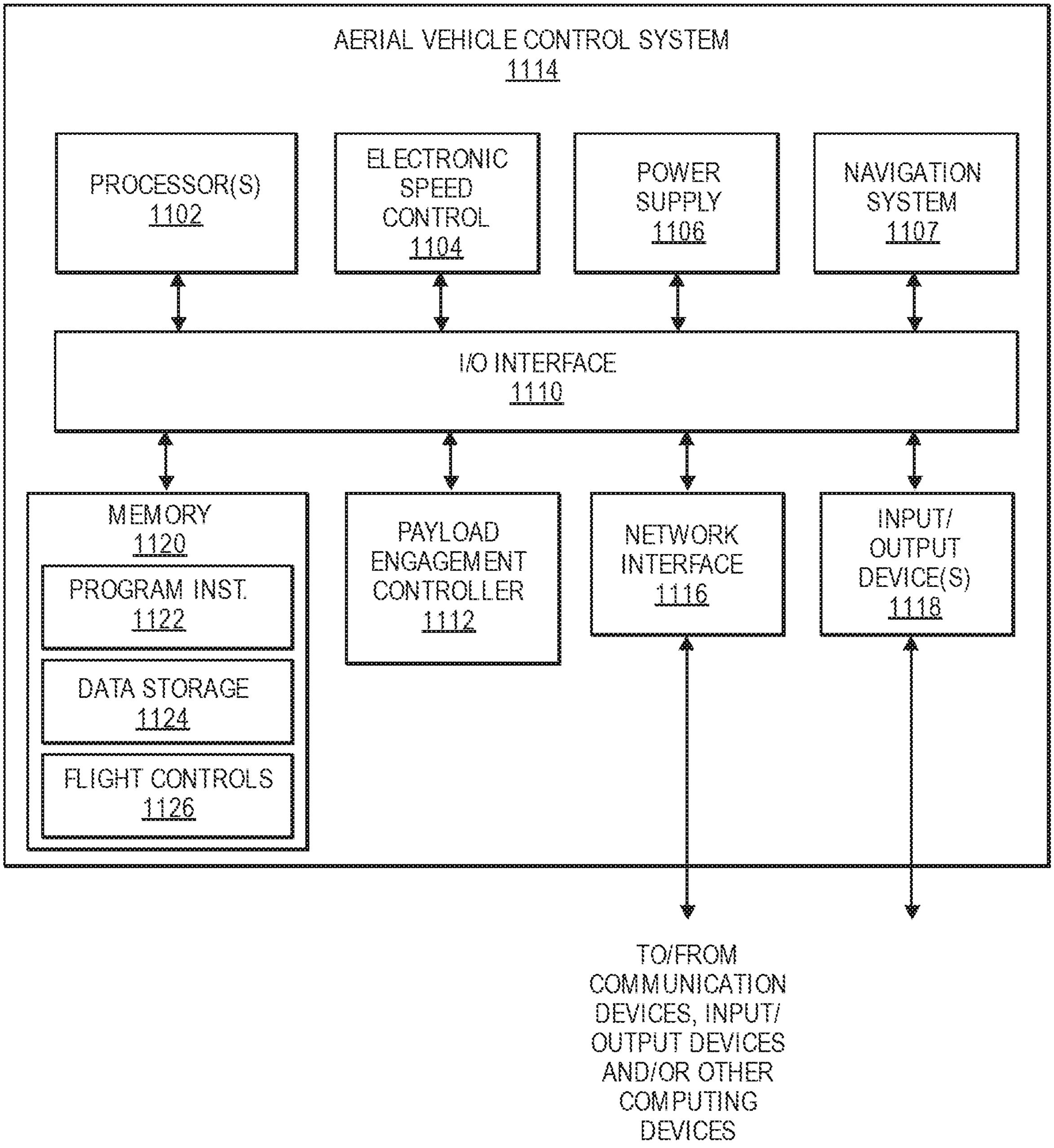
FIG. 11 is an exemplary aerial vehicle control system that may be utilized with the example aerial vehicle discussed with respect to FIG. 10.

FIG. 11 is a block diagram illustrating an example aerial vehicle control system 1114 that may be utilized by the aerial vehicle discussed with respect to FIG. 10, in accordance with disclosed implementations. In various examples, the block diagram may be illustrative of one or more aspects of the aerial vehicle control system 1114 that may be used to implement the various systems and methods discussed herein and/or to control operation of the aerial vehicles described herein. In the illustrated implementation, the aerial vehicle control system 1114 includes one or more processors 1102, coupled to a memory, e.g., a non-transitory computer readable storage medium 1120, via an input/output (I/O) interface 1110. The aerial vehicle control system 1114 may also include electronic speed controls 1104 (ESCs), power supply modules 1106, a navigation system 1107, and/or a payload engagement controller 1112. In some implementations, the navigation system 1107 may include an inertial measurement unit (IMU). The aerial vehicle control system 1114 may also include a network interface 1116, and one or more input/output devices 1118.

In various implementations, the aerial vehicle control system 1114 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, data, flight paths, flight control parameters, and/or data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1120 as program instructions 1122, data storage 1124 and flight controls 1126, respectively. In other implementations, program instructions, data, and/or flight controls may be received, sent, or stored upon different types of computer-accessible media, such as non-transitory media, or on similar media separate from the non-transitory computer readable storage medium 1120 or the aerial vehicle control system 1114. Generally speaking, a non-transitory, computer readable storage medium may include storage media or memory media such as magnetic or optical media, e.g., disk or CD/DVD-ROM, coupled to the aerial vehicle control system 1114 via the I/O interface 1110. Program instructions and data stored via a non-transitory computer readable storage medium may be transmitted by transmission media or signals, such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface 1116 or other peripheral interfaces, such as input/output devices 1118. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The ESCs 1104 communicate with the navigation system 1107 and adjust the rotational speed of each lifting motor and/or the thrusting motor to stabilize the aerial vehicle and guide the aerial vehicle along a determined flight path. The navigation system 1107 may include a GPS, indoor positioning system (IPS), IMU or other similar systems and/or sensors that can be used to navigate the aerial vehicle 1000 to and/or from a location. The payload engagement controller 1112 communicates with actuator(s) or motor(s) (e.g., a servo motor) used to engage and/or disengage items.

The network interface 1116 may be configured to allow data to be exchanged between the aerial vehicle control system 1114, other devices attached to a network, such as other computer systems (e.g., remote computing resources), and/or with aerial vehicle control systems of other aerial vehicles. For example, the network interface 1116 may enable wireless communication between the aerial vehicle that includes the aerial vehicle control system 1114 and an aerial vehicle control system that is implemented on one or more remote computing resources. For wireless communication, an antenna of an aerial vehicle or other communication components may be utilized. As another example, the network interface 1116 may enable wireless communication between numerous aerial vehicles. In various implementations, the network interface 1116 may support communication via wireless general data networks, such as a Wi-Fi network. For example, the network interface 1116 may support communication via telecommunications networks, such as cellular communication networks, satellite networks, and the like.

Input/output devices 1118 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 1118 may be present and controlled by the aerial vehicle control system 1114. One or more of these sensors may be utilized to assist in landing, avoid obstacles during flight, and/or to measure and record flight conditions during flight.

As shown in FIG. 11, the memory may include program instructions 1122, which may be configured to implement the example routines and/or sub-routines described herein. The data storage 1124 may include various data stores for maintaining data items that may be provided for determining flight paths, landing, identifying locations for disengaging items, engaging/disengaging the thrusting motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1114 is merely illustrative and is not intended to limit the scope of the present disclosure. In particular, the computing system and devices may include any combination of hardware or software that can perform the indicated functions. The aerial vehicle control system 1114 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

The computers, servers, devices, computing resources and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device or method to interact with the computers, servers, devices and the like, or to "select" a control, link, node, hub or any other aspect of the present disclosure.

Those of ordinary skill in the pertinent arts will understand that process steps described herein as being performed by an "electronic commerce service," an "aerial vehicle management service," a "flight path service," an "inventory management service" or like terms, may be automated steps performed by their respective computer systems, or implemented within software modules (or computer programs) executed by one or more general purpose computers.

The data and/or computer executable instructions, programs, firmware, software and the like (also referred to herein as "computer executable" components) described herein may be stored on a computer-readable medium that is within or accessible by computers or computer components such as the computing resources 907 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6-8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
- obtaining, from a computing device, a source location;
- obtaining, from the computing device, a delivery destination;
- determining a threshold risk;
- determining a flight path forming at least a portion of a flight between the source location and the delivery destination;
- obtaining ground information associated with the flight path;
- determining a ground risk associated with the flight path based at least in part on the ground information;
- obtaining vehicle information associated with the flight path;
- determining a vehicle risk associated with the flight path based at least in part on the vehicle information;
- determining a cumulative risk associated with the flight path based at least in part on the ground risk and the vehicle risk;
- comparing the cumulative risk associated with the flight path against the threshold risk;
- in response to determining that the cumulative risk associated with the flight path is below the threshold risk, causing an aerial vehicle to operate a flight via the determined flight path; and
- in response to determining that the cumulative risk associated with the flight path is above the threshold risk, determining that the aerial vehicle is not to operate the flight via the determined flight path and returning, to the computing device, an indication that aerial delivery is unavailable for the source location and the ground location.

2. The computer-implemented method of claim 1, further comprising:
- determining a second flight path forming at least a second portion of the flight between the source location and the delivery destination;
- determining a second cumulative risk associated with the second flight path;
- comparing the cumulative risk associated with the flight path against the second cumulative risk associated with the second flight path; and
- selecting one of the flight path or the second flight path as a preferred flight path based at least in part on the cumulative risk associated with the flight path and the second cumulative risk associated with the second flight path.

3. The computer-implemented method of claim 2, further comprising:
- determining a third flight path forming at least a third portion of the flight between the source location and the delivery destination;
- determining a third cumulative risk associated with the third flight path;

determining a fourth flight path forming at least a fourth portion of the flight between the source location and the delivery destination;

determining a fourth cumulative risk associated with the fourth flight path;

comparing the third cumulative risk associated with the third flight path against the fourth cumulative risk associated with the fourth flight path; and selecting one of the third flight path or the fourth flight path as a next path of the preferred flight path based at least in part on the third cumulative risk associated with the third flight path and the fourth cumulative risk associated with the fourth flight path.

4. The computer-implemented method of claim 1, wherein:

the ground risk represents a probability of causing harm to a person; and the vehicle risk represents a probability of experiencing a vehicle failure.

5. The computer-implemented method of claim 1, wherein:

ground information includes at least one of:

a population density;

a presence of a sensitive structure; or an indication of an event that temporarily increases population density; and vehicle information includes at least one of:

a flight duration;

at least one vehicle parameter; or at least one flight path parameter.

6. A computing system, comprising:

one or more processors;

a memory coupled to the one or more processors and storing program instructions that, when executed by the one or more processors, cause the one or more processors to at least:

determine a source location and a delivery location;

generate a risk-weighted model representing a cumulative flight risk associated with an environment associated with the source location and the delivery location, the cumulative flight risk based at least in part on a ground risk and a vehicle risk;

determine a preferred flight path within the environment based at least in part on the cumulative flight risk associated with environment;

obtain a threshold flight risk;

compare the cumulative flight risk with the threshold flight risk;

in response to a first determination that the cumulative flight risk is below the threshold flight risk, cause an aerial vehicle to operate a flight via the preferred flight path; and in response to a second determination that the cumulative flight risk is above the threshold flight risk, determine that the aerial vehicle is not to operate the flight via the preferred flight path and return, to a computing device, an indication that aerial delivery is unavailable for the source location and the delivery ground location.

7. The computing system of claim 6, wherein determination that the cumulative flight risk is below the threshold flight risk is performed incrementally.

8. The computing system of claim 6, wherein determination of the preferred flight path is further based at least in part on at least one of an economic cost or a time duration.

9. The computing system of claim 6, wherein the preferred flight path is incrementally determined based at least in part on the risk-weighted model using at least one of an A* algorithm or a gradient descent algorithm.

10. The computing system of claim 6, wherein the risk-weighted model includes a risk-weighted four-dimensional graph representing an incremental cumulative flight risk within the environment and the four dimensions include a position and a time.

11. The computing system of claim 6, wherein:

the ground risk is based at least in part on at least one of:

a population density;

a presence of a sensitive structure; or an indication of an event that temporarily increases population density; and the vehicle risk is based at least in part on at least one of:

a flight duration;

at least one vehicle parameter; or at least one flight path parameter.

12. The computing system of claim 6, wherein the risk-weighted model includes a plurality of cumulative flight risks associated with a plurality of flight paths within the environment.

13. The computing system of claim 12, wherein the plurality of cumulative flight risks includes a first cumulative flight risk associated with a first flight path from the plurality of flight paths and a second cumulative flight risk associated with a second flight path from the plurality of flight paths, and determination of the preferred flight path includes a comparison of the first cumulative flight risk and the second cumulative flight risk.

14. The computing system of claim 13, wherein comparison of the first cumulative flight risk and the second cumulative flight risk is performed incrementally.

15. A computer-implemented method, comprising:

receiving a request from a client device in connection with an item offered on an electronic commerce platform;

obtaining a delivery destination corresponding to a user associated with the client device;

determining a source location associated with the item;

determining a flight path between the source location and the delivery destination;

obtaining ground information associated with the flight path;

determining a ground risk associated with the flight path based at least in part on the ground information;

obtaining vehicle information associated with the flight path;

determining a vehicle risk associated with the flight path based at least in part on the vehicle information;

determining a cumulative risk associated with the flight path based at least in part on the ground risk and the vehicle risk;

comparing the cumulative risk against a threshold risk;

in response to determining that the cumulative risk associated with the flight path is below the threshold risk:

sending for presentation on the client device an aerial delivery option in connection with the item; and initiating an aerial delivery of the item from the source location to the delivery destination via the flight path; and in response to determining that the cumulative risk associated with the flight path is above the threshold risk, sending for presentation on the client device an indication that aerial delivery is unavailable in connection with the item.

16. The computer-implemented method of claim 15, wherein the cumulative risk associated with the flight path is determined incrementally to include a lowest relative cumulative risk.

17. The computer-implemented method of claim 15, further comprising:

determining that the cumulative risk includes a time-dependent factor;

determining a time at which the cumulative risk no longer includes the time-dependent factor; and sending for presentation on the client device an indication that aerial delivery is available at the time.

18. The computing system of claim 6, wherein the vehicle risk represents a probability of vehicle failure based at least in part on vehicle information.

* * * * *